United States Patent [19]
Ito et al.

[11] Patent Number: 5,662,188
[45] Date of Patent: Sep. 2, 1997

[54] DEVICE FOR EFFECTIVE LUBRICATION OF VEHICLE POWER TRANSMISSION SYSTEM UPON STARTING OF VEHICLE

[75] Inventors: Hiroshi Ito; Hideki Yasue; Daisuke Inoue, all of Toyota, Japan

[73] Assignee: Toyota Jidosha Kabushiki Kaisha, Toyota, Japan

[21] Appl. No.: 502,619

[22] Filed: Jul. 14, 1995

[30] Foreign Application Priority Data

Aug. 12, 1994 [JP] Japan .................. 6-190253
May 18, 1995 [JP] Japan .................. 7-119547

[51] Int. Cl.⁶ .................................. F01M 9/00
[52] U.S. Cl. ................. 184/6.3; 184/6.12; 184/11.1; 74/467
[58] Field of Search .................. 184/6.3, 6.12, 184/11.1, 11.2, 11.3, 13.1; 74/467

[56] References Cited

U.S. PATENT DOCUMENTS

| | | | |
|---|---|---|---|
| 1,176,936 | 3/1916 | Waldon | 184/6.3 |
| 2,861,477 | 11/1958 | Mueller . | |
| 4,169,519 | 10/1979 | Hirt et al. | 184/6.3 |
| 4,658,665 | 4/1987 | Strinzel et al. | 74/467 |
| 4,699,249 | 10/1987 | Fujimura et al. | 184/11.1 |
| 4,736,819 | 4/1988 | Muller | 184/6.12 |
| 4,751,858 | 6/1988 | Iwatsuki . | |
| 4,896,561 | 1/1990 | Hayakawa et al. | 184/6.12 |
| 4,962,830 | 10/1990 | Potts | 184/6.12 |
| 5,115,887 | 5/1992 | Smith . | |

FOREIGN PATENT DOCUMENTS

| | | |
|---|---|---|
| 0 074 799 | 3/1983 | European Pat. Off. . |
| 0 443 901 | 8/1991 | European Pat. Off. . |
| 32 08 100 | 9/1983 | Germany . |
| 39 21 932 | 1/1991 | Germany . |
| 40 35 624 | 5/1992 | Germany . |
| 62-20609 | 1/1987 | Japan . |
| 3-8816 | 3/1991 | Japan . |
| 5-89061 | 12/1993 | Japan . |
| 2 273 323 | 6/1994 | United Kingdom . |

*Primary Examiner*—Thomas E. Denion
*Attorney, Agent, or Firm*—Oblon, Spivak, McClelland, Maier & Neustadt, P.C.

[57] ABSTRACT

A lubricating device for a motor vehicle including (a) a power transmission system having rotating members which are all at rest upon stopping of the vehicle, (b) a casing accommodating the power transmission system and storing a lubricating oil, and (c) an oil pump which is driven by the power transmission system and which operates to deliver the oil from the bottom portion of the casing to lubricating points of the power transmission system. An oil reservoir is provided to store a predetermined amount of the oil delivered by the pump, when a delivery amount of the pump exceeds a predetermined value with an increase in the speed of the power transmission system. A bath of the lubricating oil stored in the bottom portion of the casing has a first oil level when no oil is stored in the reservoir such that a portion of the power transmission system is immersed in the bath of the lubricating oil, and a second oil level when the predetermined amount of the oil delivered by the pump is stored in the reservoir such that the lower end of the power transmission system is located above the second oil level.

8 Claims, 12 Drawing Sheets

FIG. 11
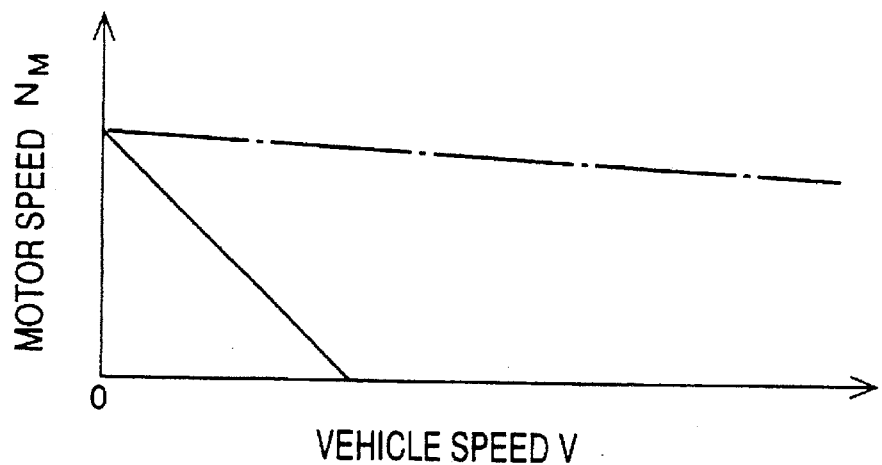
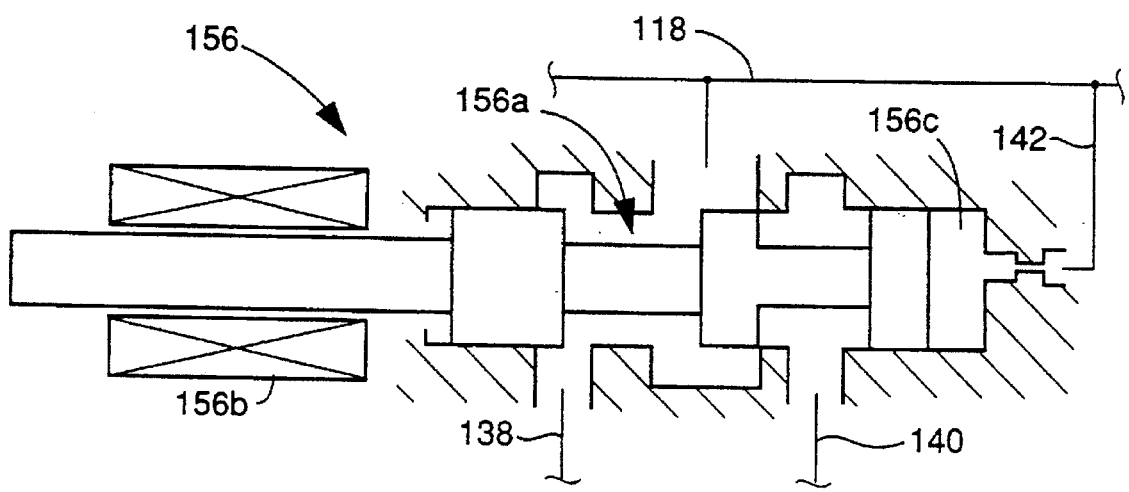
FIG. 12

DEVICE FOR EFFECTIVE LUBRICATION OF VEHICLE POWER TRANSMISSION SYSTEM UPON STARTING OF VEHICLE

BACKGROUND OF THE INVENTION

1. Field of the Invention

The present invention relates in general to a lubricating device for a power transmission system of a motor vehicle wherein all rotating members are at rest upon stopping of the vehicle, and more particularly to such a lubricating device utilizing a mechanical pump which is driven by the power transmission system.

2. Discussion of the Prior Art

A power transmission system such as a transmission, a speed reducing device or a differential gear device used in a motor vehicle is equipped with a lubricating device for lubricating various rotating members of the power transmission system so as to protect bearing portions and mutually meshing portions of the rotating members from seizure and early wearing. There are proposed various types of such a lubricating device for the vehicle power transmission system. As one example of the lubricating device, a so-called "oil bath lubrication" is known, wherein portions of the power transmission system are immersed in a lubricating oil stored in a suitable oil pan, and the lubricating oil is scattered by the rotating members within the power transmission system during operation. Another example of the lubricating device is known as a so-called "forced-feed lubrication", wherein the lubricating oil stored in the oil pan is sucked and pressurized by a suitable oil pump, and the pressurized oil is delivered to the lubricating points such as the bearing and meshing portions of the rotating members. In a lubricating device as disclosed in laid-open Publication No. 5-89061 of unexamined Japanese Utility Model Application, the power transmission system is subject to the oil bath lubrication when the running speed of the vehicle is relatively low, while on the other hand, the power transmission system is subject to the forced-feed lubrication as well as the oil bath lubrication when the running speed of the vehicle is relatively high. Further, two types of the forced-feed lubrication are known, i.e., mechanical forced-feed lubrication in which the pump for delivering the lubricating oil is driven by a member of the power transmission system, and an electrically-operated forced-feed lubrication in which an electrically operated pump is employed to deliver the lubricating oil.

In the oil-bath lubrication as described above, the stored lubricating oil is agitated and scattered by the rotating members of the power transmission system when these members are rotated. In this case, the vehicle undesirably suffers from an energy loss especially when the vehicle is running at a relatively high speed, that is, when the rotating members of the power transmission system are rotated at a relatively high speed. When the oil bath lubrication is used in an electric vehicle, for example, the travel distance of the vehicle per one battery charging is undesirably reduced. Further, since the lubricating oil is agitated intensively by the rotating members, the oil is apt to be overheated, leading to early deterioration of the oil. Moreover, as a result of the agitation of the oil by the rotating members, bubbles likely to be formed in the lubricating oil and the transmission system tends to suffer from an oil leakage.

In some electric vehicle, the vehicle speed is controlled exclusively by the rotating speed of a drive motor of the vehicle. In this case, however, the rotating speed of the input shaft of the power transmission system is extremely high during running of the vehicle at a high speed, and the power transmission system cannot necessarily be lubricated to a satisfactory extent by the oil bath lubrication.

In the lubricating device as disclosed in the above publication, the power transmission system is subject to the forced-feed lubrication in addition to the oil bath lubrication while the vehicle is running at a relatively high speed. This arrangement is capable of assuring a sufficient lubricating effect during running of the vehicle at a relatively high speed. Further, the amount of the lubricating oil used for the oil bath lubrication can be decreased, and the energy loss due to the agitation of the oil by the rotating members is accordingly reduced. However, as long as the power transmission system is subject to the oil bath lubrication while the vehicle is running at a high speed, the vehicle suffers from an energy loss due to the agitation of the oil by the rotating members of the power transmission system. Thus, the disclosed lubricating device is not necessarily satisfactory when used in the electric vehicle in which the rotating speed of the power transmission system is extremely high when the vehicle running speed is relatively high and in which an improvement of the travel distance per one battery charging is required.

Unlike the oil bath lubrication, the above-described mechanical forced-feed lubrication is not likely to cause the energy loss. However, in the electric vehicle, all of the rotating members of the power transmission system are turned off when the vehicle is stopped. Accordingly, a mechanical oil pump which is adapted to be driven by the rotation of the power transmission system is also turned off, and therefore, the lubricating oil is no more supplied to the power transmission system. This means that the power transmission system cannot be adequately lubricated upon restarting of the vehicle after a stop. Described in detail, upon starting of the vehicle, the power transmission system starts to be rotated and accordingly, the lubricating oil is delivered by the mechanical pump and gradually supplied to the power transmission system. In the actual operating state of the vehicle, however, it takes some time before the delivered oil reaches the power transmission system. Furthermore, the rotating speed of the power transmission system is usually relatively low upon and immediately after starting of the vehicle, and accordingly, the amount of the lubricating oil delivered from the pump is small. However, a large amount of the lubricating oil is required to sufficiently lubricate the power transmission system upon and immediately after starting of the vehicle, since a comparatively large torque is transmitted to the power transmission system via the input shaft thereof and a relatively large amount of load acts on the bearing and meshing portions of the power transmission system. In case that the vehicle wheels slip on the road surface upon starting of the vehicle, the gears of the differential gear device are rotated at a high speed with a large amount of load applied thereto, and therefore a large amount of the lubricating oil is required to lubricate the gears. If the gears are not adequately lubricated, they would be damaged due to shortage of the lubricating oil.

In the electrically-operated forced-feed lubrication, the electric pump is capable of delivering the lubricating oil to the power transmission system irrespective of the rotating speed of the power transmission system. Thus, the electrically-operated forced-feed lubrication is preferably employed in the electric vehicle wherein all of the rotating members of the power transmission system are turned off upon stopping of the vehicle. However, the electrically-operated forced-feed lubrication suffers from various problems as described below. For example, the electrically-operated forced-feed lubrication needs an electric motor for driving the electric pump, pushing up the cost of manufacture of the lubricating device as compared with the above-described mechanical forced feed-lubrication. Further, components of the electric motor such as a brush have a comparatively shorter service life than the vehicle itself, and they should be replaced or checked regularly. This regular replacement and checking make the vehicle maintenance cumbersome. To obtain a sufficient lubricating effect upon starting of the vehicle in the lubricating device employing the electric pump, the electric pump motor must be kept in the operating state for driving the electric pump so as to enable the lubricating oil to be continuously delivered to the power transmission system even while the vehicle is at a stop, since it is not possible to anticipate when the accelerator pedal is depressed by the vehicle driver for restarting the vehicle. In this case, the electric power consumed by the electric motor for continuously driving the electric pump is generally larger than the energy loss experienced in the mechanical forced-feed lubrication wherein the mechanical pump is driven by the rotation of the power transmission system.

SUMMARY OF THE INVENTION

It is therefore an object of the present invention to provide a lubricating device for lubricating a power transmission system of a motor vehicle wherein the rotating members are all at rest upon stopping of the vehicle, which lubricating device uses a mechanical pump driven by the power transmission system to deliver a lubricating oil, and which assures an improved lubricating effect upon starting of the vehicle.

The above object may be attained according to a first aspect of the present invention which provides a lubricating device for a motor vehicle including (a) a power transmission system having rotating members which are all at rest upon stopping of the vehicle, (b) a casing which accommodates the power transmission system and which stores a lubricating oil in a bottom portion thereof, and (c) a mechanical oil pump which is driven by the power transmission system and which operates to deliver the lubricating oil from the bottom portion of the casing to lubricating points of the power transmission system, the lubricating device comprising: an oil reservoir which stores a predetermined amount of the lubricating oil delivered by the mechanical pump, when a delivery amount of the mechanical oil pump exceeds a predetermined value with an increase in a rotating speed of the power transmission system; and a bath of the lubricating oil stored in the bottom portion of the casing having a first oil level (A) when an amount of the lubricating oil stored in the oil reservoir is substantially zero, and a second oil level (B) when the predetermined amount of the lubricating oil delivered by the mechanical pump is stored in the oil reservoir, the first oil level being determined such that a portion of the power transmission system is immersed in the bath of the lubricating oil, the second oil level being determined such that the lower end of the power transmission system is located above the second oil level.

In the lubricating device constructed according to the first aspect of the invention, when the delivery amount of the mechanical oil pump exceeds the predetermined value with an increase in the rotating speed of the power transmission system, the predetermined amount of the lubricating oil is accumulated in the oil reservoir. As a result, the amount of the lubricating oil stored in the bottom portion of the casing decreases by an amount corresponding to the amount of oil stored in the oil reservoir. In this arrangement, the lubricating oil stored in the casing has the first oil level at which a portion of the power transmission system is immersed in the lubricating oil bath in the bottom portion of the casing when the amount of the lubricating oil stored or accumulated in the oil reservoir is substantially zero, and the second oil level which is below the lower end of the power transmission system when the predetermined amount of the lubricating oil is stored in the oil reservoir. Accordingly, the power transmission system is subject to the oil bath lubrication before the predetermined amount of the oil is stored in the oil reservoir as a result of an increase in the rotating speed of the power transmission system.

In the present lubricating device, the power transmission system is mainly forced-feed lubricated by the mechanical oil pump, while at the same time, the power transmission system is subject to the oil bath lubrication before the predetermined amount of the oil is accumulated in the oil reservoir with an increase in the rotating speed of the power transmission system. Thus, the lubricating device assures a satisfactory lubricating effect upon and immediately after starting of the vehicle, that is, when the rotating speed of the power transmission system is relatively low. As the rotating speed of the power transmission system increases, the lubricating oil is accumulated in the oil reservoir. Consequently, the lubricating oil which has been stored in the bottom portion of the casing decreases to such an extent that the power transmission system is no more immersed in the oil bath. In this state, the oil bath lubrication is not effected, and therefore, the power transmission system is lubricated exclusively by the forced-feed lubrication by the mechanical oil pump, thereby to avoid the energy loss and the overheating of the lubricating oil which would result from the agitation of the oil by the rotating members of the power transmission system while the rotating speed of the power transmission system is relatively high. The present device assures effective lubrication when used in an electric vehicle wherein the rotating speed of the power transmission system is excessively high during high-speed running of the vehicle.

The predetermined critical delivery amount of the mechanical oil pump at which the lubricating oil starts to be stored in the oil reservoir is an amount which ensures that the lubricating device exhibits a satisfactory lubricating effect only by the forced-feed lubrication effected by the mechanical oil pump. It is desirable that the critical delivery amount be set at a value as low as possible to minimize the energy loss due to the agitation of the oil by the rotating members of the power transmission system. The oil reservoir in the present lubricating device may be an accumulator. In this case, when the delivery amount of the oil pump exceeds the predetermined critical value and the hydraulic pressure of the oil becomes higher than a predetermined value, the lubricating oil is gradually accumulated in the accumulator with a retracting movement of a piston in the accumulator in a direction to increase the volume of the accumulating chamber of the accumulator. The oil reservoir may be provided with flow regulating means for allowing the accumulated lubricating oil to be discharged at a controlled flow rate, such as an orifice or a flow restrictor having a suitable cross sectional area, or a flow control valve. In this case, the lubricating oil flowing into the oil reservoir is discharged without being accumulated therein while the delivery amount of the mechanical oil pump is small, and the lubricating oil starts to be accumulated in the oil reservoir when an amount of the oil flowing into the oil reservoir exceeds a predetermined value. The lubricating oil discharged from the oil reservoir may be returned directly into the oil bath at the bottom of the casing or directed to the lubricating points in the power transmission system.

In the thus constructed lubricating device, the power transmission system is sufficiently lubricated over an entire range of its rotating speed from a relatively low speed to a relatively high speed while reducing the energy loss and avoiding the overheating of the lubricating oil. The present device is preferably employed in an electric vehicle in which the rotating speed of the power transmission system is considerably high while the vehicle running speed is high. Further, the present device is effective to improve the travel distance per one battery charging of the electric vehicle. In the lubricating device according to this aspect of the invention, the power transmission system which is principally forced-feed lubricated by the oil delivered from the mechanical pump is also oil-bath lubricated while the vehicle running speed is relatively low. This arrangement permits reduced cost of manufacture of the lubricating device and reduced electric power consumption of the vehicle, as compared with the electrically-operated forced-feed lubrication system wherein the pump for delivering the lubricating oil is driven by an electric motor. Furthermore, this arrangement assures a satisfactory lubricating effect with high reliability and permits easy maintenance of the vehicle, minimizing regular checking and replacement of a brush and other components of the electric pump motor.

The above object may be attained according to a second aspect of the invention which provides a lubricating device for a motor vehicle including (a) a power transmission system having rotating members which are all at rest upon stopping of the vehicle, and (b) a mechanical oil pump which is driven by the power transmission system and which operates to deliver a lubricating oil from an oil sump to lubricating points of the power transmission system, the lubricating device comprising: an oil reservoir which stores a part of the lubricating oil delivered by the mechanical pump; a discharge line through which the lubricating oil stored in the oil reservoir is discharged to the lubricating points of the power transmission system; and flow restricting means for restricting a rate of flow of the lubricating oil discharged from the oil reservoir through said discharge line.

In the lubricating device constructed as described above, the lubricating oil is delivered by the mechanical oil pump to the lubricating points by the rotation of the power transmission system during running of the vehicle, while at the same time, a part of the lubricating oil is stored in the oil reservoir. The stored oil in the oil reservoir is discharged via the discharge line to the lubricating points at a flow rate determined by the flow restricting means. In this arrangement, therefore, even when the lubricating oil is not delivered by the oil pump upon or immediately after stopping of the vehicle, the lubricating points are adequately lubricated for a predetermined length of time by the oil which is supplied from the oil reservoir at the predetermined flow rate. Thus, the present lubricating device is free from an insufficient supply of the lubricating oil when the vehicle is restarted after stopping for a relatively short length of time, during which the lubricating oil continues to be delivered from the oil reservoir. The lubricating device is capable of assuring a satisfactory lubricating effect owing to the lubricating oil discharged from the oil reservoir, when the power transmission system is rotated at a relatively low speed, that is, when the lubricating points cannot be sufficiently lubricated by the lubricating oil delivered from the mechanical oil pump.

The storage capacity of the oil reservoir and the rate of the discharge flow determined by the flow restricting means are predetermined such that the lubricating oil in the oil reservoir continues to be discharged therefrom for at least 3–5 minutes so as to ensure that the lubricating points can be sufficiently lubricated by the lubricating oil supplied from the oil reservoir when the vehicle is restarted after stopping at a traffic signal light, for instance. Upon an initial starting of the vehicle or restarting after stopping for a relatively long length of time, the power transmission system cannot be forced-feed lubricated by the lubricating oil stored in the oil reservoir, since the lubricating oil is not stored in the oil reservoir. However, the present device assures a satisfactory lubricating effect when the vehicle is restarted after stopping for a relatively short length of time during which the lubricating oil in the oil reservoir continues to be discharged therefrom and delivered to the lubricating points in the power transmission system. Thus, the device is capable of protecting the bearing portions and the power transmission gears from suffering from seizure, wearing, or damages due to the shortage of the lubricating oil, thereby to assure a considerably improved service life of the components of the power transmission system, as compared with a lubricating device in which the lubricating points are lubricated only by the oil delivered from the oil pump.

Upon restarting of the vehicle after stopping for a relatively short length of time, the power transmission system is lubricated by the lubricating oil discharged from the oil reservoir. In the present lubricating device, accordingly, it is not always required to immerse the power transmission system in the lubricating oil bath at the bottom of the casing, unlike the lubricating device according to the first aspect of the invention. Thus, the present device is effective to further reduce the energy loss due to the agitation of the lubricating oil by the power transmission system. As in the lubricating device according to the first aspect, the present device offers a satisfactory lubricating effect when used in an electric vehicle wherein the rotating speed of the power transmission system is considerably high during high-speed running of the vehicle.

The lubricating device according to this aspect of the invention is preferably constructed such that the lubricating oil delivered by the mechanical pump is supplied exclusively to the lubricating points while the power transmission system is rotating at a relatively low speed immediately after the starting of the vehicle, for instance, and such that the lubricating oil starts to be accumulated in the oil reservoir only after the delivery amount of the oil pump exceeds a predetermined value with a rise in the rotating speed of the power transmission system. In view of this, the oil reservoir preferably takes the form of an accumulator which is adapted to accumulate the lubricating oil when the hydraulic pressure of the lubricating oil delivered from the oil pump is higher than a predetermined value. In the lubricating device employing the accumulator, the lubricating oil stored in the accumulator is forced to be discharged therefrom. Unlike the oil reservoir without the flow restricting means wherein the stored oil drops by gravity from the oil reservoir, the accumulator has a freedom in setting the rate of discharge flow of the oil from the accumulator. Further, there is less limitation in determining the location of the accumulator. Namely, the accumulator may be located beside or below the power transmission system.

In the present lubricating device, a part of a forced-feed oil passage for supplying the lubricating oil delivered by the oil pump to the lubricating points may be utilized as the discharge line through which the lubricating oil discharged from the oil reservoir is fed so as to lubricate the lubricating points. However, it is possible to provide an exclusive discharge line independently of the forced-feed oil passage. The flow restricting means in the present device may be an orifice (or a flow restrictor) whose cross sectional area for the fluid flow is constant so as to obtain a desired flow rate. Alternatively, a flow control valve may be preferably employed, which is manually adjustable to change the flow rate as desired.

It is to be understood from the above description that the present device according to the second aspect of the invention assures a satisfactory lubricating effect owing to the lubricating oil supplied from the oil reservoir as described above when the vehicle is restarted after stopping for a relatively short length of time or while the rotating speed of the power transmission system is relatively low. Thus, the device is capable of protecting the bearing portions and the power transmission gears from suffering from seizure, wearing, or damages due to the shortage of the lubricating oil, thereby to assure a considerably improved service life of the components of the power transmission system, as compared with the lubricating device in which the lubricating points are lubricated only by the oil delivered from the oil pump. Moreover, it is not always required to immerse the power transmission system in the lubricating oil. Thus, the present device is effective to further reduce the energy loss due to the agitation of the lubricating oil by the power transmission system.

The above object may be attained according to a third aspect of the invention which provides a lubricating device for a motor vehicle including (a) a power transmission system having rotating members which are all at rest upon stopping of the vehicle, and (b) a mechanical oil pump which is driven by the power transmission system and which operates to deliver a lubricating oil from an oil sump to lubricating points of the power transmission system, the lubricating device comprising: an oil reservoir which stores a part of the lubricating oil delivered by the mechanical pump; a discharge line through which the lubricating oil stored in the oil reservoir is discharged to the lubricating points of the power transmission system; valve means which is selectively placed in an open position and a closed position for permitting and inhibiting a discharge flow of the lubricating oil from the oil reservoir through the discharge line, respectively; and valve control means for receiving information indicating whether an amount of the lubricating oil delivered to the lubricating points is insufficient, determining, on the basis of the information, whether or not the lubricating points suffer from shortage of the lubricating oil, and placing the valve means in the open position if the amount of the lubricating oil delivered to the lubricating points is insufficient.

The lubricating device according to the third aspect of the invention is provided with the valve means in the discharge line through which the lubricating oil is discharged from the oil reservoir. The valve means is selectively placed in an open position and a closed position for permitting and inhibiting the discharge flow of the oil from the oil reservoir through the discharge line. The valve control means is adapted to receive suitable information for determining whether or not the lubricating points suffer from shortage of the lubricating oil. The valve control means controls the valve means to be placed in the open position for permitting the discharge flow from the oil reservoir when the lubricating points suffer from shortage of the lubricating oil. For example, the valve control means can determine that the lubricating points suffer from the shortage of the oil when the delivery amount of the oil pump is small, in other words, when the vehicle speed or the rotating speed of the power transmission system is low. On the other hand, however, the oil amount required for the lubrication varies depending upon a load applied to the power transmission system, i.e., the rotating speed of the power transmission system, the torque transmitted to the power transmission system, or a rate of change in the transmitted torque. In view of this fact, it is desirable to effect the determination taking these parameters into consideration. The present device may be provided with detecting means as needed to obtain these parameters, such as means for detecting the speed of the transmission or means for detecting an electric current applied to the drive motor. In an electric vehicle, a command generated by a controller for controlling the torque of the electric drive motor may be used by the valve control means to control the valve means. Since the torque of the electric drive motor is usually controlled depending on an operating amount of the accelerator, the valve control means may use the operating amount of the accelerator or a rate of change in this operating amount as the information indicative of the load acting on to the power transmission system.

The valve means in the present device is adapted to permit or inhibit the discharge flow of the lubricating oil from the oil reservoir through the discharge line. However, the valve means may be a flow regulating valve which regulates or restricts the flow rate of the lubricating oil discharged from the oil reservoir. In this case, the valve control means may adjust the discharge flow rate depending on a degree of the shortage of the lubricating oil at the lubricating points.

In the lubricating device according to the third aspect of the invention, the lubricating oil accumulated in the oil reservoir is supplied to the lubricating points when these points suffer from the shortage of the oil, assuring similar advantages as described with respect to the lubricating device constructed according to the second aspect of the invention. In addition, the lubricating oil in the oil reservoir is more effectively utilized for lubricating the power transmission system, whereby the bearing portions and the gears of the power transmission system are protected against seizure, wearing or damages resulting from the shortage of the lubricating oil, so as to assure a further improved service life of the components of the power transmission system.

The object may be attained according to a fourth aspect of the invention which provides a lubricating device for a motor vehicle including (a) a power transmission system having rotating members which are all at rest upon stopping of the vehicle, and (b) a mechanical oil pump which is driven by the power transmission system and which operates to deliver a lubricating oil from an oil sump to lubricating points of the power transmission system, the lubricating device comprising: an oil reservoir which stores a part of the lubricating oil delivered by mechanical pump; a discharge line through which the lubricating oil stored in the oil reservoir is discharged to the lubricating points of the power transmission system; flow restricting means for restricting a rate of flow of the lubricating oil discharged from the oil reservoir through the discharge line; and an oil retaining member which is constituted by a part of the transmission system and which is rotated during running of the vehicle, the oil retaining member having a space in which the lubricating points are disposed, the space receiving the lubricating oil discharged from the oil reservoir and retaining the received oil, the oil retaining member permitting the lubricating oil to be discharged from the space into the oil sump due to a centrifugal force generated when the rotating speed of the power transmission system is higher than a predetermined value.

In the lubricating device according to the fourth aspect of the invention, the oil retaining member is constituted by a part of the power transmission system, and at least a portion of the lubricating points is disposed within the space of the oil retaining member. The lubricating oil delivered from the oil pump or the oil reservoir is supplied to and kept within the oil retaining member. The lubricating oil in the oil retaining member is permitted to be discharged into the oil sump by a centrifugal force generated when the rotating speed of the oil retaining member is high. As in the lubricating device according to the first aspect of the invention, the lubricating points of the power transmission system are subject to the oil bath lubrication as well as the forced-feed lubrication by the pump while the rotating speed of the power transmission system is relatively low, immediately after starting of the vehicle, for instance. With a rise in the rotating speed of the power transmission system, the lubricating oil in the oil retaining member is discharged into the oil sump due to the centrifugal force, so that the lubricating points are mainly forced-feed lubricated by the lubricating oil delivered from the oil pump.

In the thus constructed lubricating device, the lubricating oil is stored in the oil reservoir during running of the vehicle, and the stored oil is discharged from the oil reservoir to the lubricating points, at a given flow rate controlled by the flow restricting means. If the vehicle stops after a high-speed running of the vehicle during which the lubricating oil is discharged from the oil retaining member by the centrifugal force, the amount of the oil within the oil retaining member is not sufficient. However, the lubricating oil is supplied to the oil retaining member from the oil reservoir during stopping of the vehicle, and the lubricating points within the space of the oil retaining member are sufficiently lubricated, when the vehicle is restarted after stopping. In particular, the lubricating oil is kept in the oil retaining member for a relatively long period, so that the lubricating points are immersed in the lubricating oil in the oil retaining member. Accordingly, the present arrangement assures further effective lubrication when the vehicle is restarted after stopping for a relatively long period, as compared with the lubricating device according to the second aspect of the invention wherein the lubricating oil is discharged from the oil reservoir to the lubricating points for a relatively short length of time after the oil pump is turned off. The volume of the oil reservoir in the present lubricating device is sufficient as long as a sufficient amount of the lubricating oil can be supplied to the oil retaining member. Accordingly, the volume of the oil reservoir in the present lubricating device can be made smaller than in the device according to the first aspect of the invention, leading to reduction in a total amount of the oil required in the lubricating device. Further, if the oil retaining member rotates in the same direction as the lubricating points, the energy loss due to the agitation of the oil can be reduced.

Since the oil retaining member itself rotates during running of the vehicle, the lubricating oil leaks from the oil retaining member through the bearing portion of the rotating shaft. The present lubricating device may be constructed such that the discharge amount of the oil from the oil retaining member due to the centrifugal force increases with an increase in the rotating speed of the oil retaining member and such that the oil amount kept in the oil retaining member is substantially zero when the rotating speed exceeds a predetermined threshold, terminating the oil bath lubrication in the oil retaining member. In this case, if a leakage flow rate of the lubricating oil from the oil retaining member is made smaller, it is possible to keep a sufficient amount of the oil in the oil retaining member for a relatively long period, e.g., from one week to one month. However, if the leakage flow rate from the oil retaining member is made smaller, a relatively large amount of the oil is kept in the oil retaining member. When the rotating speed of the power transmission system becomes high in this state, the discharge amount of the oil from the oil retaining member due to the centrifugal force is reduced, undesirably causing the energy loss due to the agitation of the oil by the power transmission system. Accordingly, in view of the usual operating condition of the vehicle, it is preferable that the lubricating oil be kept in the oil retaining member over a period from several days to one week, to provide a satisfactory lubricating effect upon starting of the vehicle while reducing the energy loss experienced when the rotating speed of the power transmission system is high. The present device may be provided with a pressure relief valve which is adapted to be opened when the centrifugal force exceeds a predetermined suitable value. The relief valve is effective to minimize the energy loss due to the agitation of the lubricating oil otherwise experienced while the rotating speed of the power transmission system is high. Further, the leakage flow rate from the oil retaining member can be made smaller so as to keep the lubricating oil in the oil retaining member for a relatively long period, e.g., from one week to one month.

The lubricating device according to the fourth aspect of the invention assures effective lubrication upon restarting of the vehicle even after stopping for a relatively long period, as compared with the lubricating device according to the second aspect of the invention. Like the lubricating device according to the first aspect of the invention, the present device lubricates the power transmission system by the oil bath lubrication while the rotating speed of the power transmission system is relatively low. In the present device, however, a portion of the lubricating points is disposed in the oil retaining member, leading to reduction in the oil capacity of the oil reservoir and the total amount of the oil required in the lubricating device. The energy loss due to the agitation of the oil by the transmission power system is further reduced if the lubricating points in the oil retaining member rotate in the same direction as the oil retaining member.

As indicated above, an accumulator may be used as the oil reservoir, which starts to store the lubricating oil when the hydraulic pressure of the oil exceeds a predetermined value.

When the accumulator is used in the lubricating device according to the first aspect of the invention as described above, the lubricating oil starts to be stored when the delivery amount of the oil pump becomes larger than a predetermined value and the hydraulic pressure of the oil delivered from the oil pump exceeds a predetermined value (a set pressure of the accumulator). In this arrangement, the set pressure of the accumulator may be adjusted by suitable pressure setting means such as a spring which biases the piston of the accumulator, so that the rotating speed of the power transmission system at which the oil bath lubrication is terminated can be easily adjusted as desired, by changing the biasing force of the spring, for example.

When the above accumulator is employed in the lubricating devices according to the second through fourth aspects of the invention as described above, the lubricating oil delivered by the oil pump is supplied mainly to the lubricating points, when the hydraulic pressure of the delivered oil is lower than a predetermined value, namely, when the rotating speed of the power transmission system is relatively low (e.g., during starting of the vehicle). Thus, the device assures more effective lubrication while the rotating speed of the power transmission is low. The lubricating oil stored in the accumulator is forced to be discharged therefrom after the hydraulic pressure becomes higher than the predetermined value. Unlike the lubricating device wherein the accumulated oil drops by gravity, the accumulator of the present device has a high degree of freedom in setting the rate of discharge flow of the oil from the accumulator. Further, there is less limitation in determining the location of the accumulator. Namely, the accumulator may be located beside or below the power transmission system.

The set pressure of the accumulator may be set at a constant value predetermined depending upon a biasing force of the spring and a load applied to the spring. Alternatively, the set pressure may be adjusted continuously by controlling a back pressure of the accumulator such as an air pressure.

The object of the invention may be attained according to a sixth aspect of the invention which provides a lubricating device for a motor vehicle including (a) a power transmission system having rotating members which are all at rest upon stopping of a vehicle, and (b) a mechanical oil pump which is driven by the power transmission system and which operates to deliver a lubricating oil from an oil sump to lubricating points of the power transmission system, the lubricating device comprising: an electrically driven oil pump which is disposed in parallel with the mechanical oil pump and which is operated by an electric power source, the electrically driven pump delivering the lubricating oil from the oil sump to the lubricating points of the power transmission system; electric pump control means for actuating the electrically driven pump when a delivery amount of the mechanical pump is insufficient for lubricating the lubricating points.

In the thus constructed lubricating device, the second pump actuated by the on-vehicle electric power source is disposed in parallel with the first mechanical pump. The second pump is actuated by the electric pump control means when the lubricating points can not be adequately lubricated by the lubricating oil delivered from the mechanical oil pump. Namely, the electrically driven pump is actuated to deliver the lubricating oil to the lubricating points while the vehicle running speed is relatively low, that is, while the delivery amount of the mechanical oil pump is insufficient for lubricating the lubricating points. Though it is not necessary to continue to supply the lubricating oil during stopping of the vehicle, the electric pump may be kept in its operating state to supply the oil during the stopping of the vehicle. In this case, the power transmission system can be sufficiently lubricated by the supplied oil when the vehicle is restarted after stopping. On the other hand, the electrically driven pump is turned off while the vehicle running speed is high, that is, while the delivery amount of the mechanical pump is sufficient for lubricating the lubricating points.

The electric pump control means determines whether or not the lubricating points suffer from the shortage of the lubricating oil, on the basis of received information. For instance, the control means receives information which directly or indirectly represents the delivery amount of the mechanical oil pump, and determines whether or not this delivery amount is sufficient to lubricate the lubricating points. However, the control means may effect the determination in various other manners. For example, the control means may effect the determination by judging whether or not the pressure of the oil delivered from the mechanical pump is higher than a predetermined value.

The delivery amount of the mechanical pump may be obtained from detecting means which actually detects the delivery amount of the mechanical pump. However, this detecting means may be replaced by detecting means for detecting the speed of the power transmission system or the vehicle speed, since the delivery amount of the mechanical pump corresponds to the rotating speed of the power transmission system or the vehicle running speed.

When the control means determines whether the lubricating points suffer from the shortage of the oil by comparing the delivery amount of the mechanical pump with a required amount of the oil to be supplied to the lubricating points, this required amount may be a predetermined constant amount which assures satisfactory lubrication irrespective of the rotating speed of the power transmission system or the torque transmitted to the power transmission system. However, the required amount varies depending on the load acting on the power transmission system, i.e., the rotating speed of the power transmission system, the torque transmitted to the power transmission system, or a rate of change in the transmitted torque. Accordingly, the required amount may be obtained on the basis of these parameters, and the lubricating device may be provided as needed with detecting means for detecting the speed of the power transmission system, or detecting means for detecting an electric current of the drive motor. The control means may receive a command which is generated by a controller for controlling the torque of an electric drive motor of an electric vehicle. Since the torque of the electric drive motor is usually controlled depending on the operating amount of the accelerator, the control means may use the operating amount of the accelerator or a rate of change in the operating amount for obtaining the required oil amount.

In the present lubricating device, the electric pump control means may be adapted to obtain a shortage amount of the oil by comparing the delivery amount of the mechanical pump with the required amount of the oil which should be supplied to the lubricating points. On the basis of the obtained shortage amount, the control means controls the operation of the electric pump, so that the delivery amount of the electric pump is accurately controlled in steps or continuously. For reducing the electric power consumption for actuating the electric pump, it is preferable to intricately control the delivery amount of the electric pump. However, the control means may simply turn on or off the electric pump depending on the determination whether or not the lubricating points suffer from the shortage of the oil.

The mechanical pump and the electric pump for delivering the lubricating oil to the lubricating points are exclusively used for the lubrication of the power transmission system. However, these pumps may function to supply a working fluid to a power steering device which is adapted to boost a steering force which acts on a steering wheel of the vehicle. In this case, the lubricating oil is used as the working fluid for actuating the power steering device. This arrangement reduces overall cost and weight of the power steering device as compared with an arrangement wherein an exclusive electric pump is provided with the power steering device. The operation of the electric pump is controlled while taking into account the amount of the lubricating oil supplied to the power steering device.

In the thus constructed lubricating device, the electric pump is actuated when the delivery amount of the mechanical pump is insufficient for lubricating the lubricating portions. Accordingly, the lubricating points are free from the shortage of the oil during low-speed running or starting of the vehicle, thereby protecting the bearing portions and the gears from seizure, wearing or damages so as to assure considerably improved service life of the components of the power transmission system, as in the lubricating device according to the first aspect of the invention. In the present lubricating device, since the power transmission system is not always immersed in the lubricating oil, the energy loss due to the agitation of the oil by the power transmission system can be further reduced. While the vehicle is running at a relatively high speed, that is, while the delivery amount of the mechanical pump is sufficient for lubricating the lubricating points, the electric pump is turned off. Thus, the electric power consumption is reduced in the present device as compared with a lubricating device wherein the lubricating oil is supplied exclusively by the electrically driven pump. Further, the service life of a brush and other components of the electric pump is significantly improved, assuring easy maintenance of the vehicle and improved operating reliability of the lubricating device.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 11 is a graph showing a relationship between the rotating speed of the electric motor used in the lubricating device of FIG. 8 and the vehicle speed;

FIG. 12 is a view showing one example of a valve which may be used in the lubricating device of FIG. 8 in place of the pressure control valve and the flow control valve.

DETAILED DESCRIPTION OF THE PREFERRED EMBODIMENTS

Figure 1:
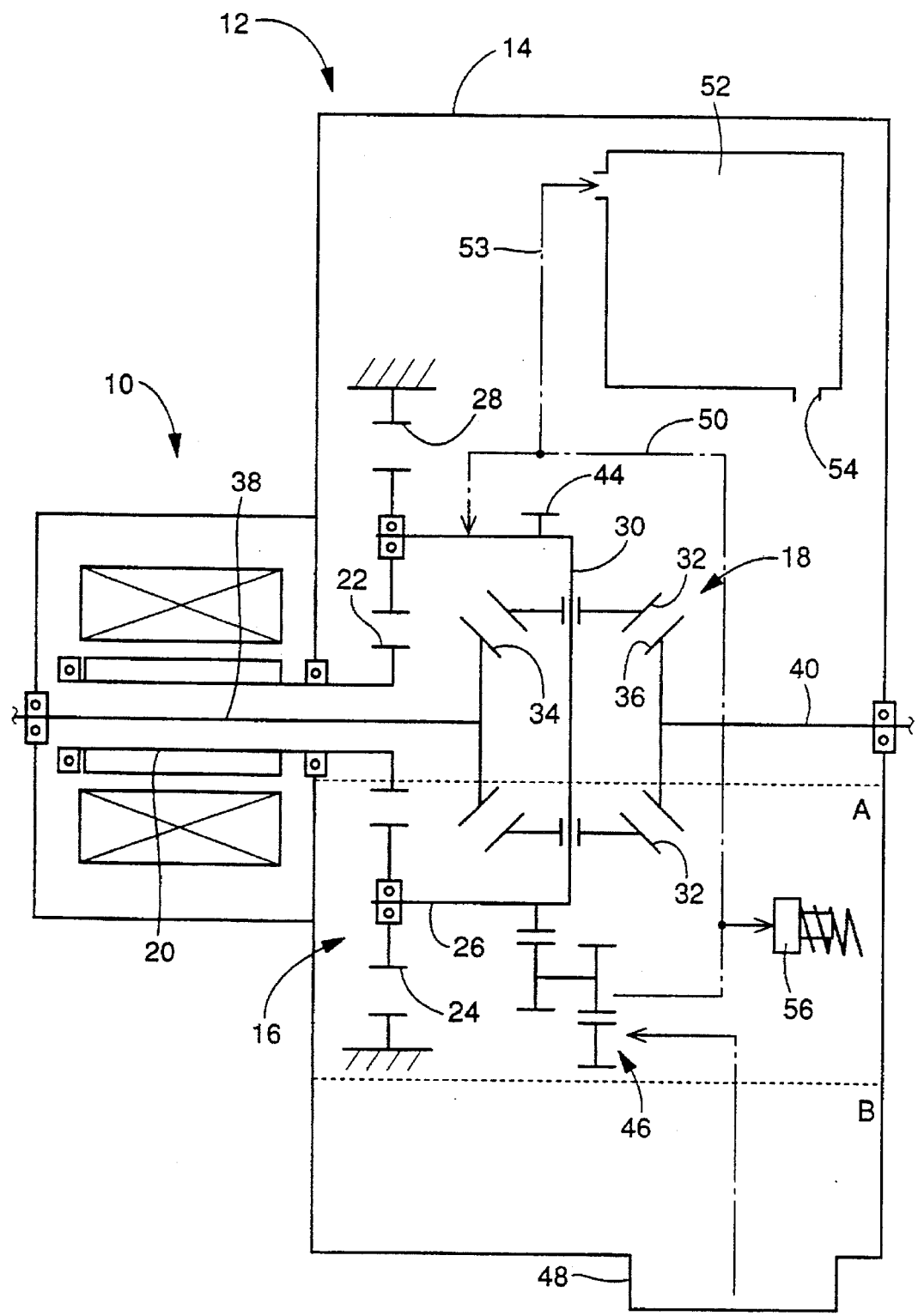
FIG. 1 is a schematic diagram showing a power transmission system for use in an electric vehicle, which is equipped with a lubricating device according to one embodiment of the present invention.

Referring first to the schematic diagram of FIG. 1, there are illustrated an electric drive motor 10 and a transaxle 12 for an electric motor vehicle. The transaxle 12 includes a casing 14, a planetary gear type speed reducing device 16 and a bevel gear type differential gear device 18, which are accommodated within the casing 14 so as to be disposed coaxially with the electric drive motor 10. The speed reducing device 16 includes a sun gear 22 connected to a motor shaft 20 of the drive motor 10, a plurality of planetary gear pinions 24 meshing with the sun gear 22, a carrier 26 rotatably supporting the planetary gear pinions 24, and a ring gear 28 secured to the casing 14 and meshing with the planetary gear pinions 24. The differential gear device 18 includes a shaft 30 which is integrally fixed to the carrier 26 and which is rotated in a plane perpendicular to an axis of the speed reducing device 16, a pair of first bevel gears 32 rotatably mounted on the shaft 30, second bevel gears 34, 36 which are provided so as to be rotatable coaxially with the speed reducing device 16 and which mesh with the respective first bevel gears 32. The second bevel gears 34, 36 are splined to respective transmission shafts 38, 40 which are connected to respective left and right drive wheels of the vehicle, such that the second bevel gears 34, 36 are rotated together with the transmission shafts 38, 40. The rotation of the motor shaft 20 of the drive motor 10 is inputted to the sun gear 22, and outputted to the differential gear device 18 through the carrier 26, with the ring gear 28 functioning as a reaction element. The rotating speed of the carrier 26 is reduced with respect to the sun gear 22 at a predetermined suitable gear ratio of the speed reducing device 16. Thus, the rotation of the motor 10 is transmitted to the transmission shafts 38, 40 via the speed reducing device 16 and the differential gear device 18. In this embodiment, the speed reducing device 16, differential gear device 18 and transmission shafts 38, 40 constitute a power transmission system. It is noted that the transaxle 12 as shown in FIG. 1 is made larger than the drive motor 10 as shown in the figure.

Figure 2:
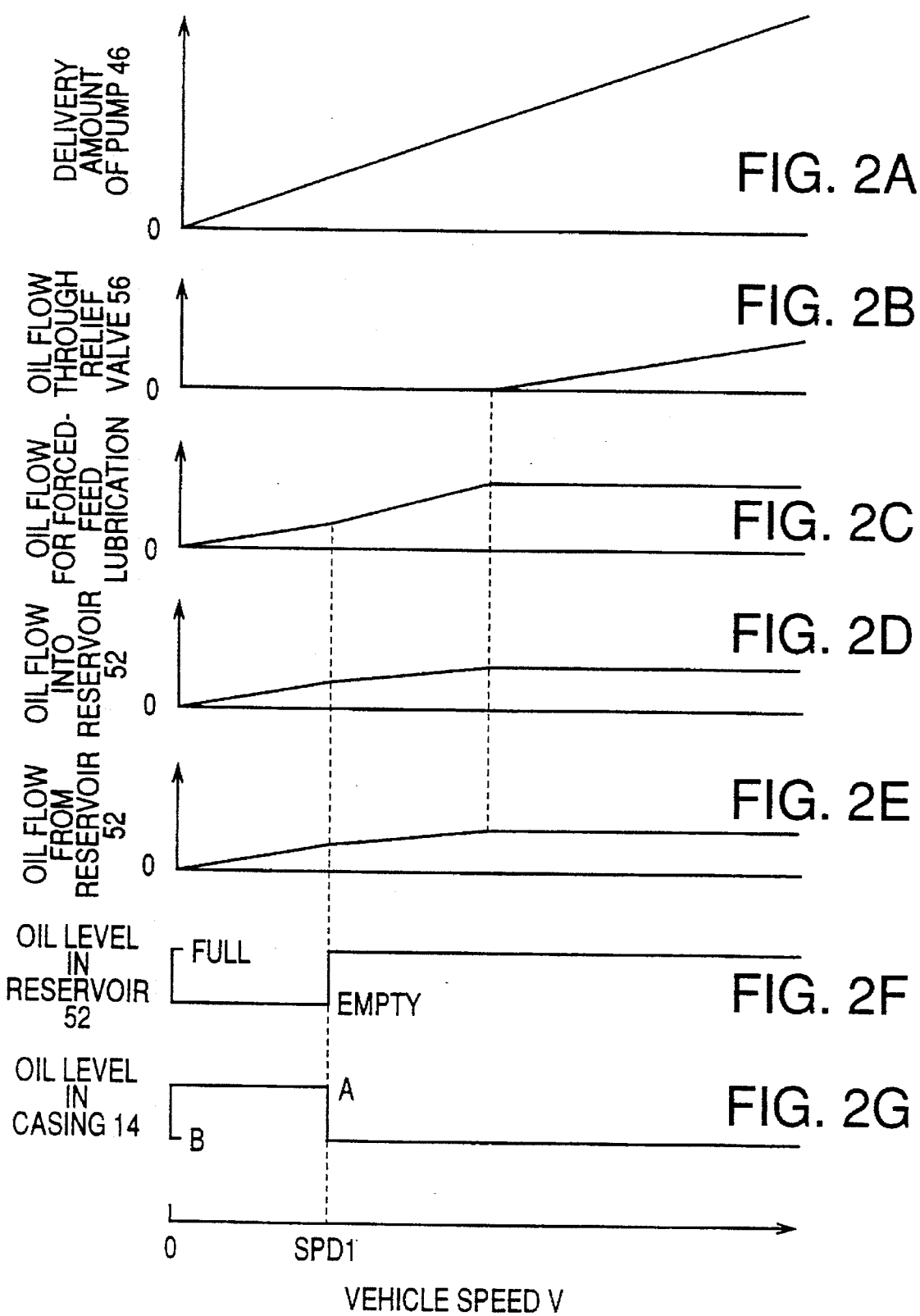
FIGS. 2A–2G are graphs showing oil levels and flow rates in the lubricating device of FIG. 1, which vary with the running speed of the vehicle.

To the carrier 26, there is connected a pump drive gear 44 for driving a mechanical pump in the form of a gear type pump 46. When the gear 44 is rotated by rotation of the carrier 26 during running of the vehicle, the gear pump 46 sucks a lubricating oil from an oil pan 48 formed in the bottom portion of the casing 14, and delivers the lubricating oil, via a forced-feed oil passage 50 formed in the casing 14 and transaxle 12, to selected lubricating points of the power transmission system such as bearing portions of the motor shaft 20 of the drive motor 10, planetary gears 24, transmission shafts 38, 40, meshing portions of the gears of the speed reducing device 16 and the differential gear device 18. A delivery amount of the gear pump 46 changes proportionally with a change in the rotation speed of the carrier 26 and the vehicle speed V. As shown in the graph of FIG. 2A, the delivery amount of the gear pump 46 linearly changes with the vehicle speed V. The delivery amount of the gear pump 46 is zero when the vehicle speed V is zero, i.e., while the vehicle is stopped. The lubricating oil which has been supplied to the lubricating points of the power transmission system drops down from the lubricating points into the bottom portion of the casing 14 or is fed back to the same through a return passage not shown. The amount of lubricating oil stored within the casing 14 is predetermined so that the oil bath has an oil level A indicated by an upper broken line in FIG. 1, namely, so that the substantially lower half portions of the speed reducing device 16 and the differential gear device 18 are immersed in the oil bath when the transmission system is at rest. The gear pump 46 may be replaced by any other mechanical pump such as a vane pump or a Roots pump (a lobe-type rotary pump).

To the forced-feed oil passage 50, there is connected, via a branch oil passage 53, an oil reservoir 52 which is disposed at an upper portion of the casing 14. The oil reservoir 52 is adapted to receive a part of the lubricating oil delivered by the gear pump 46. The lubricating oil flowing into the oil reservoir 52 is discharged therefrom by gravity at a predetermined flow rate through a drain port 54 formed at the bottom of the oil reservoir 52. The amount of the oil discharged from the drain port 54 before the vehicle speed V reaches a predetermined speed SPD1 is equal to an amount of the lubricating oil flowing into the oil reservoir 52. In other words, the lubricating oil flowing into the oil reservoir 52 is discharged through the drain port 54 without being accumulated in the oil reservoir 52 before the vehicle speed V reaches the speed SPD1. The amount of the lubricating oil flowing into the oil reservoir 52 exceeds the amount of discharge from the drain port 54 after the vehicle speed V reaches the speed SPD1 and before the oil reservoir 52 becomes full of the oil. As a result, the lubricating oil is accumulated in the oil reservoir 52. The oil capacity of the oil reservoir 52 is determined such that the lubricating oil stored within the casing 14 has an oil level B indicated by a lower broken line in FIG. 1 when the oil reservoir 52 is full of the lubricating oil. This oil level B is determined so that the speed reducing device 16 and the differential gear device 18 are positioned above the oil level B, i.e., these devices are no more immersed in the lubricating oil stored in the bottom portion of the casing 14. In this arrangement, therefore, while the vehicle running speed is lower than the predetermined speed SPD1, the power transmission system is subject to the oil bath lubrication, with the portions of the speed reducing device 16 and the differential gear device 18 being immersed in the lubricating oil stored in the bottom portion of the casing 14. At the same time, the power transmission system is subject to the forced-feed lubrication wherein the speed reducing device 16 and the differential gear device 18 are lubricated by the lubricating oil delivered by the gear pump 46 and fed through the forced-feed oil passage 50. After the vehicle speed reaches the predetermined speed SPD1, the oil level in the casing 14 is lowered to the level B as described above, at which it is impossible to effect the oil bath lubrication, since the oil level B is below the speed reducing device 16 and the differential gear device 18. Thus, these devices are subject to only the forced-feed lubrication. It is preferable that the predetermined speed SPD1 be set at a value low enough to reduce the energy loss due to agitation of the lubricating oil by the power transmission system while ensuring that the power transmission system is sufficiently forced-feed lubricated only by the lubricating oil delivered by the gear pump 46. For instance, the value SPD1 is determined to be equal to the vehicle speed at which the rotating speed of the motor shaft 20 of the drive motor 10 is about 1000 rpm. However, the value SPD1 depends upon the gear ratio of the speed reducing device 16 and other parameters. The size of the drain port 54 is determined so that the lubricating oil starts to be accumulated in the oil reservoir 52 at the thus determined speed SPD1.

The graphs of FIGS. 2A–2G show oil levels and flow rates of the lubricating oil, which vary with the running speed of the vehicle. The oil levels and flow rates as shown are those which are established when the vehicle speed is held at each value (e.g., SPD1) for a long time. In this respect, it is noted for example that the oil reservoir 52 is filled with the oil if the vehicle speed is held at the predetermined critical speed SPD1. As shown in the graphs 2D and 2E, the rate of flow of the lubricating oil into the oil reservoir 52 is constantly equal to the rate of flow of the lubricating oil discharged out of the oil reservoir 52 through the drain port 54 except for the time period as described above. After the vehicle speed V exceeds the predetermined speed SPD1 and the lubricating oil is gradually accumulated in the oil reservoir 52, the rate of flow of the lubricating oil into the oil reservoir 52 continues to increase with a rise in the hydraulic pressure of the lubricating oil delivered from the gear pump 46, and the rate of discharge flow of the oil from the drain port 54 is accordingly increased. After the oil reservoir 52 is filled with the lubricating oil, the resistance of the lubricating oil to its flow into the oil reservoir 52 is made comparatively large, and the rate of increase of the amount of the lubricating oil used for the forced-feed lubrication of the lubricating points in the power transmission system is accordingly increased. To the forced-feed oil passage 50 is connected a pressure relief valve 56 for preventing an excessive rise of the pressure of the lubricating oil delivered by the gear pump 46, and reducing a load applied to the gear pump 46 so as to minimize the energy loss. The relief pressure of the valve 56 is preferably set at a value as low as possible while ensuring that the lubricating points in the power transmission system are adequately lubricated by the lubricating oil delivered from the gear pump 46. At the vehicle speed SPD1, the amount of the oil delivered by the gear pump 46 for the forced-feed lubrication is sufficient. In view of this, the relief pressure of the valve 56 may be set, for example, at a level slightly higher than a level which corresponds to the vehicle speed SPD1.

In the thus constructed lubricating device, the power transmission system is principally forced-feed lubricated by the lubricating oil delivered from the gear pump 46. However, before the vehicle speed V reaches the predetermined speed SPD1, and therefore, before the lubricating oil is accumulated in the oil reservoir 52, the portions of the speed reducing device 16 and the differential gear device 18 are immersed in the lubricating oil bath in the bottom portion of the casing 14. Accordingly, the power transmission system is subject to both the oil bath lubrication and the forced-feed lubrication until the vehicle speed V reaches the predetermined speed SPD1. This arrangement assures a satisfactory lubricating effect even when the delivery amount of the gear pump 46 is relatively small, that is, even when the rate of flow of the oil used for the forced-feed lubrication is relatively low, immediately after starting of the vehicle, for instance. Thus, this arrangement is capable of protecting the bearing portions and the gears of the power transmission system against seizure, wearing and damages which result from shortage of the lubricating oil, thereby assuring considerably improved service life of the components of the power transmission system. In this arrangement, for instance, the gears of the differential gear device 18 are also protected with high reliability from being damaged due to the shortage of the lubricating oil even when the vehicle wheels are slipping on the road surface upon starting of the vehicle.

After the vehicle speed V reaches the predetermined speed SPD1, the lubricating oil delivered from the gear pump 46 is gradually accumulated in the oil reservoir 52 via the branch oil passage 53. As a result, the level of the lubricating bath in the bottom portion of the casing 14 falls from the level A to the level B as shown in FIG. 1. In this state, the speed reducing device 16 and the differential gear device 18 are completely above the level B, making it impossible to lubricate these devices by the oil bath lubrication. Thus, the power transmission system is mainly forced-feed lubricated by the lubricating oil delivered by the gear pump 46 and fed through the forced-feed oil passage 50, effectively avoiding the energy loss and the overheating of the lubricating oil which would be caused by the agitation of the lubricating oil when the power transmission system is rotated at a relatively high speed. The forced-feed lubrication is capable of assuring a satisfactory lubricating effect when the motor shaft 20 of the drive motor 10 is rotated at a relatively high speed.

In the thus constructed lubricating device, the power transmission system is sufficiently lubricated over an entire range of its rotating speed from a relatively low speed to a relatively high speed while reducing the energy loss and avoiding the overheating of the lubricating oil supplied to the lubricating points. Further, the travel distance of the present electric vehicle per one battery charging can be considerably increased as compared with that in the conventional electric vehicle wherein the power transmission system is lubricated only by the oil-bath lubrication. In the present embodiment, the power transmission system which is principally forced-feed lubricated is also oil-bath lubricated when the vehicle running speed is relatively low. This arrangement permits reduced cost of manufacture of the lubricating device and reduced electric power consumption of the vehicle, as compared with the electrically-operated forced-feed lubrication system wherein a pump for delivering the lubricating oil is driven by an exclusive electric motor. Further, this arrangement assures a satisfactory lubricating effect with high reliability and permits easy maintenance of the vehicle, eliminating regular checking and replacement of a brush and other components of the electric pump motor.

Figure 3:
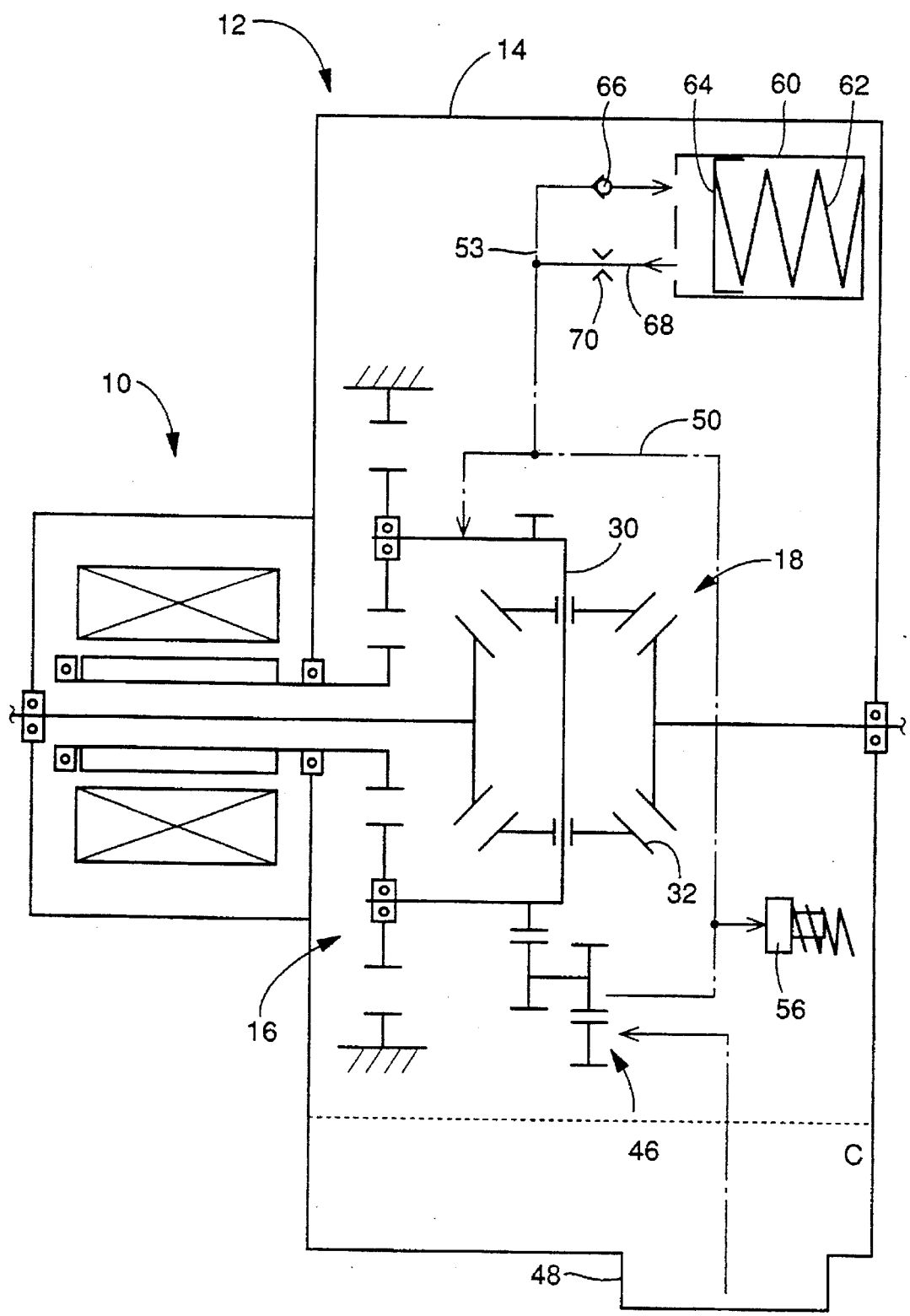
FIG. 3 is a schematic diagram showing a power transmission system equipped with a lubricating device according to another embodiment of the invention.

Referring next to FIG. 3, there will be described a lubricating device according to a second embodiment of the present invention, wherein the same reference numerals as used in the preceding first embodiment are used to identify the corresponding components and detailed explanation thereof is dispensed with.

Figure 4:
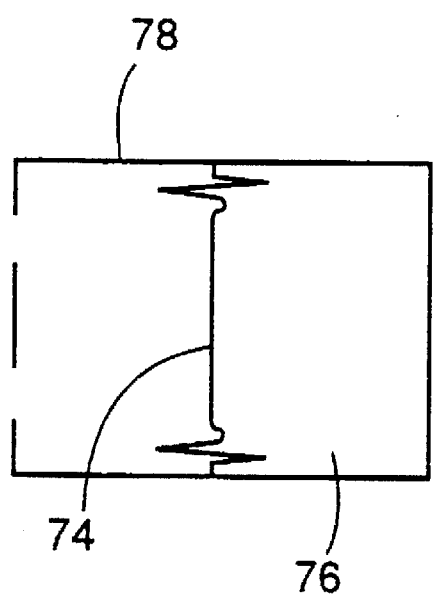
FIG. 4 is a view showing another example of an accumulator employed in the lubricating device of FIG. 3.

In this modified second embodiment, the branch oil passage 53 is connected to an accumulator 60 in place of the oil reservoir 52 used in the first embodiment. The amount of the lubricating oil stored in the casing 14 is predetermined so as to establish an oil level C as indicated by a broken line in FIG. 3, so that the speed reducing device 16 and the differential gear device 18 are positioned above the lubricating oil bath. The accumulator 60 has a piston 64 which is biased by a spring 62. When the hydraulic pressure of the lubricating oil flowing through the branch oil passage 53 becomes higher than a predetermined level (i.e., a set pressure of the accumulator 60) corresponding to the biasing force of the spring 62, the lubricating oil flows into the accumulator 60 while pushing the piston 64 against the biasing force of the spring 62. The above-indicated set pressure of the accumulator 60 is determined so as to allow the lubricating oil to flow into the accumulator 60 only after a sufficient amount of the lubricating oil is supplied to the lubricating points of the power transmission system. In this arrangement, when the rotating speed of the power transmission system is relatively low, that is, when the amount of the lubricating oil delivered by the gear pump 46 is relatively small, the delivered oil is exclusively supplied to the lubricating points for forced-feed lubrication. After a sufficient amount of the oil is delivered to the lubricating points, the oil is allowed to flow into the accumulator 60 and is accumulated therein. The set pressure of the accumulator 60 is adjusted as desired by varying the biasing force of the spring 62 or a pre-load acting on the piston 64. The accumulator 60 used in this second embodiment may be replaced by any other types of accumulators. For instance, an accumulator 78 as shown in FIG. 4 may be employed in the present lubricating device. This accumulator 78 has a gas chamber 76 which is partially defined by a diaphragm 74. The set pressure of the accumulator 78 can be adjusted by varying the gas pressure in the chamber 76.

In the thus constructed lubricating device, there is provided a check valve 66 between the branch oil passage 53 and the accumulator 60. The lubricating oil flows into the accumulator 60 through the check valve 66 when the pressure of the lubricating oil in the branch oil passage 53 is higher than the above-described set pressure of the accumulator 60. The present lubricating device is further provided with a discharge line 68 between the accumulator 60 and the branch oil passage 53 such that the discharge line 68 is disposed in parallel with the check valve 66. When the oil pressure in the branch oil passage 53 becomes lower than that in the accumulator 60, the piston 64 is moved in the biasing direction of the spring 62. As a result, the lubricating oil stored in the accumulator 60 is discharged therefrom into the branch oil passage 53 via the discharge line 68, and then supplied to the lubricating points. In the discharge line 68, there is provided with an orifice 70 as flow restricting means for restricting a flow rate of the lubricating oil discharged from the accumulator 60. In case that the gear pump 46 is turned off upon stopping of the vehicle, the lubricating oil stored in the accumulator 60 is supplied therefrom for a given length of time, i.e., about for 3–5 minutes, which is slightly longer than a usual stop time of the vehicle waiting for a traffic signal light. In this arrangement, even after the gear pump 46 is turned off when the vehicle stops, the lubricating points in the power transmission system are lubricated for a while by the lubricating oil discharged from the accumulator 60. The amount and set pressure of the accumulator 60 and the cross-sectional area for fluid flow of the orifice 70 are determined such that the lubricating oil is discharged from the accumulator 60 for a desired length of time after the gear pump 46 is turned off. In the present embodiment, the lubricating oil may flow into the accumulator 60 via the discharge line 68 when the pressure of the lubricating oil flowing through the branch oil passage 53 becomes higher than the set pressure of the accumulator 60.

In the thus constructed lubricating device, a sufficient amount of the lubricating oil is delivered by the gear pump 46 to the lubricating points during running of the vehicle, while at the same time, a part of the lubricating oil flows into the accumulator 60 via the branch oil passage 53 and is stored therein. On the other hand, when the delivery amount of the gear pump 46 decreases with a decrease in the vehicle speed and the oil pressure in the branch oil passage 53 becomes lower than that in the accumulator 60, the lubricating oil in the accumulator 60 is discharged via the discharge line 68 to the lubricating points at a flow rate controlled by the orifice 70. In this arrangement, therefore, even when the lubricating oil is not delivered by the gear pump 46 upon stopping of the vehicle, the lubricating points are adequately lubricated for the predetermined length of time by the lubricating oil which is supplied from the accumulator 60 at the predetermined flow rate via the discharge line 68. Thus, this arrangement is free from an insufficient supply of the lubricating oil when the vehicle is restarted after stopping for a relatively short length of time, during which the lubricating oil continues to be delivered from the accumulator 60. The lubricating device according to the present embodiment is capable of assuring a satisfactory lubricating effect owing to the lubricating oil discharged from the accumulator 60, when the power transmission system is rotated at a relatively low speed, that is, when the lubricating points of the power transmission system cannot be sufficiently lubricated by the lubricating oil delivered from the gear pump 46.

In the lubricating device according to the present embodiment, since the lubricating oil is not stored in the accumulator 60 upon an initial starting of the vehicle or restarting of the vehicle after stopping for a relatively long length of time, the lubricating points in the power transmission system cannot be forced-feed lubricated by the lubricating oil stored in the accumulator 60 as described above. However, this arrangement ensures a satisfactory lubricating effect when the vehicle is restarted after stopping for a relatively short length of time during which the lubricating oil in the accumulator 60 continues to be discharged via the discharge line 68 and delivered to the power transmission system. Thus, the present lubricating device is capable of protecting the bearing portions and the power transmission gears from suffering from seizure, wearing or damages due to the shortage of the lubricating oil, thereby to assure a considerably improved service life of the components of the power transmission system, as compared with a lubricating device in which the lubricating points are lubricated only by the oil delivered from the gear pump 46. In the lubricating device according to the present embodiment, the lubricating oil is allowed to flow into the accumulator 60 only after a sufficient amount of the oil is supplied to the lubricating points. Accordingly, upon initial starting of the vehicle or restarting of the vehicle after stopping for a relatively long length of time, a comparatively small amount of the lubricating oil can be efficiently utilized for forced-feed lubricating the lubricating points, since the lubricating oil delivered by the gear pump 46 is supplied exclusively to the lubricating points.

Upon restarting of the vehicle after stopping for a relatively short length of time, the power transmission system is lubricated by the lubricating oil discharged from the accumulator 60. In the present lubricating device, accordingly, it is not always required to immerse the speed reducing device 16 and the differential gear device 18 in the lubricating oil bath in the bottom portion of the casing 14, as in the preceding first embodiment. In the present arrangement, the oil stored in the casing 14 upon initial starting of the vehicle is predetermined so as to have a level C as indicated by a broken line in FIG. 3, which is below the speed reducing device 16 and the differential gear device 18. This arrangement is effective to reduce the energy loss which would be caused by the agitation of the lubricating oil by the rotating members of the power transmission system, leading to a further increased travel distance of the vehicle per one battery charging. However, the present lubricating device may be modified such that portions of the speed reducing device 16 and the differential gear device 18 are subject to the oil bath lubrication, namely, such that these devices are partially immersed in the lubricating oil bath at the bottom of the casing 14 before the lubricating oil is partly accumulated in the accumulator 60.

In the present lubricating device, the lubricating oil in the accumulator 60 is forced to be discharged due to the movement of the piston 64 in the biasing direction of the spring 62 when the oil pressure in the branch oil passage 53 becomes lower than that in the accumulator 60. Unlike the oil reservoir 52 in the lubricating device of the preceding first embodiment wherein the accumulated oil drops by gravity from the oil reservoir 52 through the drain port 54, the present accumulator 60 has a freedom in setting the rate of discharge flow of the oil from the accumulator 60 since the rate of the discharge flow is adjusted as desired by varying the cross-sectional area of the orifice 70. Further, there is less limitation in determining the location of the accumulator 60, as compared with the lubricating device of the first embodiment wherein the oil reservoir 52 is required to be located above the power transmission system.

Figure 5:
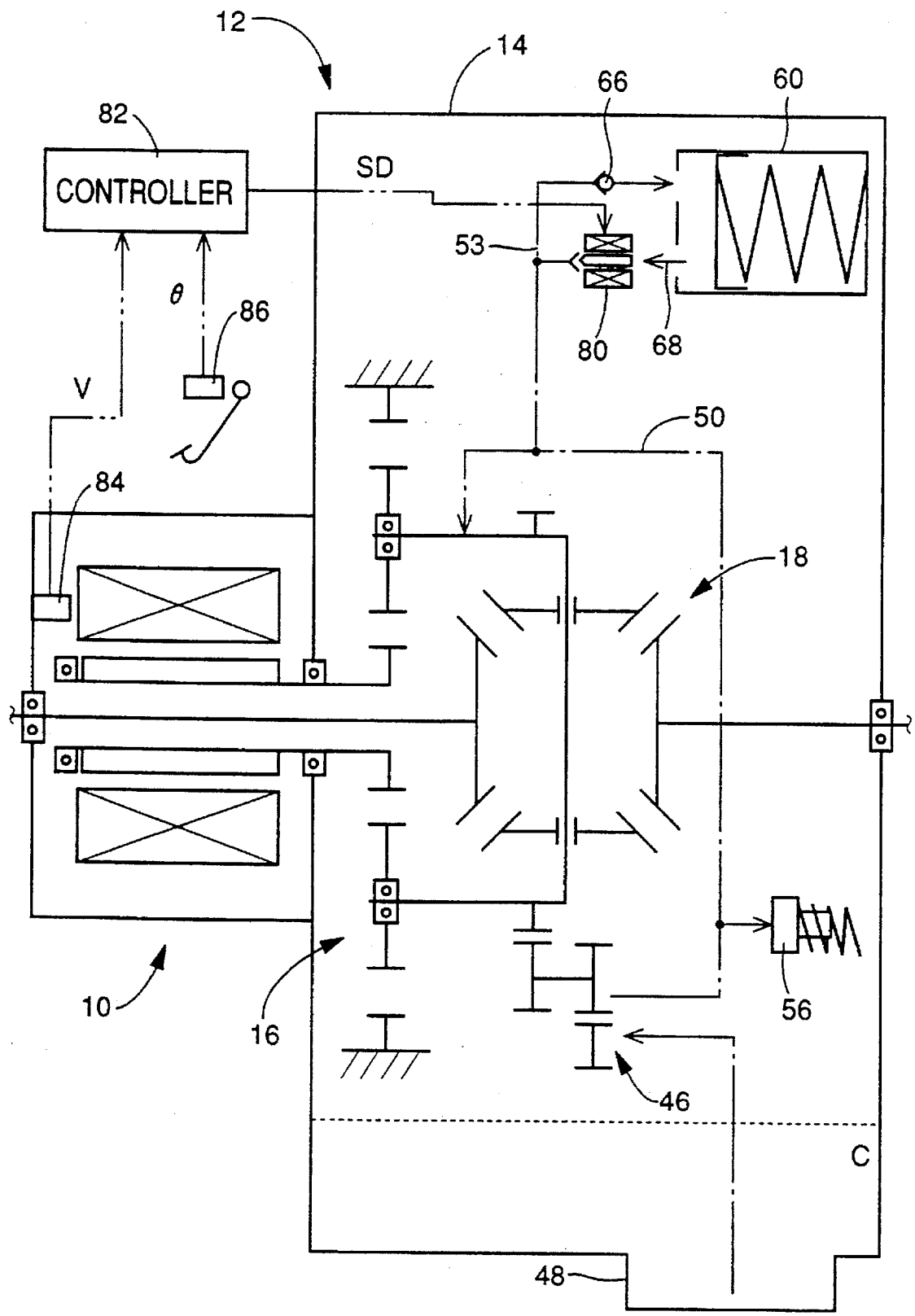
FIG. 5 is a schematic diagram showing a power transmission system with a lubricating device according to a further embodiment of the invention.

Referring next to FIG. 5, there is shown a lubricating device according to a third embodiment of the present invention. In the discharge line 68 of the lubricating device of FIG. 5, there is provided with a solenoid-operated valve 80 (hereinafter referred to as "solenoid valve") in place of the orifice 70 in the second embodiment of FIG. 3. The solenoid valve 80 is selectively placed in an open position and in a closed position under the control of a controller 82. When the solenoid valve 80 is placed in the open position, the lubricating oil stored in the accumulator 60 is allowed to be fed into the branch oil passage 53 via the discharge line 68 so as to lubricate the lubricating points in the power transmission system when the amount of oil delivered by the gear pump 46 is not sufficient to lubricate the lubricating points. The controller 82 is principally constituted by a microcomputer incorporating a CPU (central processing unit), a ROM (read-only memory) and a RAM (random-access memory). The controller 82 receives an output signal of a speed sensor 84, which indicates a rotating speed of the motor shaft 20 of the drive motor 10, and an output signal of an accelerator position sensor 86 such as a potentiometer, which indicates an operating amount $\theta$ of an accelerator pedal provided on the vehicle. The detected rotating speed of the motor shaft 20 is used to obtain a running speed V of the vehicle. Based on the obtained vehicle speed V and the detected operating amount $\theta$, the controller 82 determines whether the lubricating points suffer from the shortage of the lubricating oil. If it is determined that the lubricating points suffer from the shortage of the oil, the controller 82 outputs a drive signal SD for placing the solenoid valve 80 in the open position so as to permit the lubricating oil stored in the accumulator 60 to be discharged therefrom into the branch oil passage 53 via the discharge line 68 for lubricating the lubricating points. In the present embodiment, the solenoid valve 80 serves as valve means for permitting or inhibiting the discharge flow of the lubricating oil from the accumulator 60 while the controller 82 serves as valve control means for controlling the solenoid valve 80 to be selectively placed in the open and closed positions. Further, the vehicle speed V and the operating amount $\theta$ of the accelerator pedal detected by the respective sensors are information necessary for determining whether the lubricating points suffer from the shortage of the oil. It is noted that the operating amount $\theta$ of the accelerator pedal corresponds to a load applied to the power transmission system, since the torque of the drive motor 10 is controlled depending on the operating amount $\theta$ of the accelerator pedal.

Figure 6:
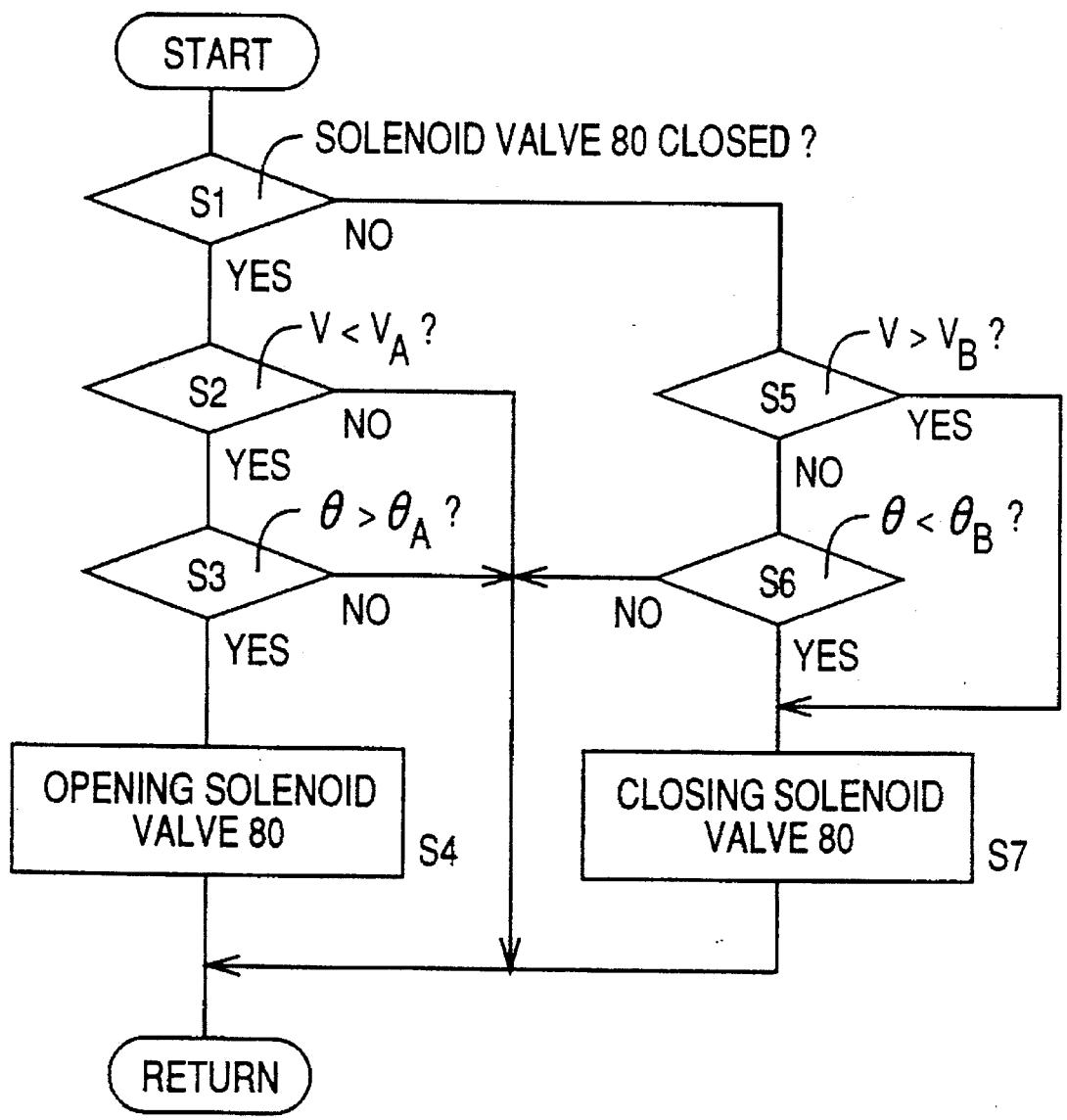
FIG. 6 is a flow chart illustrating a control program for controlling a solenoid valve used in the lubricating device of FIG. 5.

Referring to the flow chart of FIG. 6, there is shown a routine executed by the controller 82 for controlling the solenoid valve 80 to be selectively placed in the open and closed positions. The routine is initiated with step S1 to determine whether or not the solenoid valve 80 is in the closed position, based on whether the drive signal SD is present or not. If the solenoid valve 80 is in the closed position, an affirmative decision (YES) is obtained and the control flow goes to step S2 to determine whether or not the vehicle speed V is lower than a first threshold VA. If an affirmative decision (YES) is obtained in step S2, step S3 is implemented to determine whether or not the operating amount $\theta$ of the accelerator pedal is larger than a first threshold $\theta$A. If the amount $\theta$ is larger than the first threshold $\theta$A, step S3 is followed by step S4 in which the controller outputs the drive signal SD so as to place the solenoid valve 80 in the open position. When the vehicle speed V is lower than the first threshold VA and the operating amount θ of the accelerator pedal is larger than the first threshold θA, in other words, when the vehicle is running at a relatively low speed with the accelerator pedal depressed by a considerable amount, the power transmission system is subject to a relatively large load. In this state, for example, immediately after starting of the vehicle, a large amount of the lubricating oil is required for lubricating the lubricating points while the delivery amount of the gear pump 46 is insufficient. Accordingly, the controller 82 operates the solenoid valve 80 to be placed in the open position, permitting the lubricating oil stored in the accumulator 60 to be discharged therefrom and supplied to the lubricating points via the discharge line 68 and the branch oil passage 53.

On the other hand, if a negative decision (NO) is obtained in step S1, i.e., if the solenoid valve 80 is in the open position, the control flow goes to step S5 to determine whether or not the vehicle speed V is larger than a second threshold VB. If the vehicle speed V is larger than VB, this means that the power transmission system is adequately lubricated by the lubricating oil delivered by the gear pump 46, and therefore, the control flow goes to step S7 wherein the controller 82 terminates the output of the drive signal SD, to close the solenoid valve 82 for inhibiting the discharge flow of the lubricating oil from the accumulator 60. If a negative decision (NO) is obtained in step S5, i.e., if the vehicle speed V is not larger than the second threshold VB, step S5 is followed by step S6 to determine whether or not the operating amount θ of the accelerator pedal is smaller than a second threshold θB. If the amount θ is smaller than θB, it means that the load acting on the power transmission system is not large, and accordingly, the control flow goes to step S7 to place the solenoid valve 80 in the closed position to inhibit the discharge flow of the lubricating oil from the accumulator 60. It is noted that the second threshold VB is set at a value larger than the first threshold VA while the second threshold θB is set at a value lower than the first threshold θA.

In the lubricating device according to the present embodiment, the solenoid valve 80 is opened for allowing the lubricating oil to be discharged from the accumulator 60 when the lubricating points suffer from the shortage of the lubricating oil. Thus, this arrangement permits more effective utilization of the lubricating oil stored in the accumulator 60 for lubricating the power transmission system, as compared with the lubricating device of the preceding embodiment of FIG. 3, whereby the bearing portions and the gears of the power transmission system are protected against seizure, wearing or damages resulting from the shortage of the lubricating oil, so as to assure a further prolonged service life of the components of the power transmission system.

In the present embodiment, the solenoid valve 80 is opened when the vehicle speed V is smaller than the predetermined first threshold VA and the operating amount θ of the accelerator pedal is larger than the predetermined first threshold θA. However, the solenoid valve 80 may be opened according to a suitable data map for opening or closing the valve 80 depending upon the parameters V and θ, so as to permit highly accurate control of the solenoid valve 80. Alternatively, the solenoid valve 80 may be controlled by using suitable parameters other than V and θ.

Figure 7:
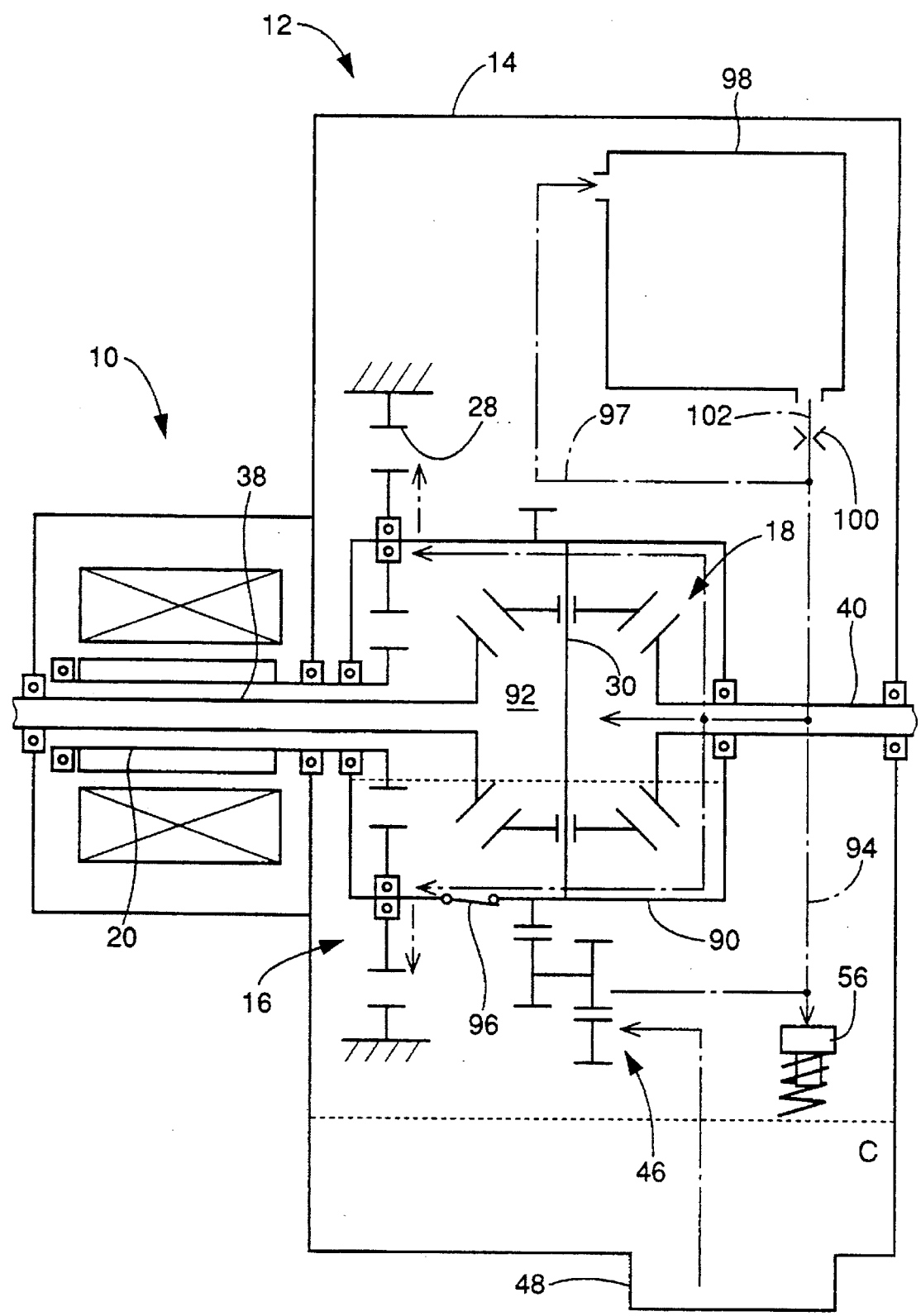
FIG. 7 is a schematic diagram showing a power transmission system with a lubricating device according to a still further embodiment of the invention.

There will be next described a lubricating device according to a fourth embodiment of the present invention with reference to FIG. 7. In the lubricating device according to this embodiment, the planetary gear-type speed reducing device 16 has a carrier 90 in which an accommodating space 92 is formed for accommodating the differential gear device 18. The accommodating space 92 receives and stores the lubricating oil delivered by the gear pump 46 and fed through a forced-feed oil passage 94 which is formed through the casing 14 and the transmission shaft 40, whereby the bearing and meshing portions of the gears of the differential gear device 18 in the accommodating space 92 are lubricated by the supplied lubricating oil. In the lubricating device of the present embodiment, additional oil passages are formed through the carrier 90 and the transmission shaft 38 so that the bearing and meshing portions of the planetary gears 24 and the bearing portions of the transmission shaft 38 and the motor shaft 20 are lubricated by the supplied lubricating oil. To the forced-feed oil passage 94, there is connected an oil reservoir 98 via a branch oil passage 97. The oil reservoir 98 receives and stores a part of the lubricating oil delivered by the gear pump 46. The lubricating oil stored in the oil reservoir 98 is discharged to the branch oil passage 97 via a discharge line 102 connected to the oil reservoir 98, and is consequently fed into the accommodating space 92 through the forced-feed oil passage 94. The discharge line 102 has an orifice 100 as flow restricting means for restricting the rate of discharge flow of the lubricating oil from the oil reservoir 98. The differential gear device 18 in the accommodating space 92 is subject to the oil bath lubrication with the portions of the differential gear device 18 being immersed in the lubricating oil in the accommodating space 92. The lubricating oil leaks from the accommodating space 92, through the bearing portions of the differential gear device 18, for instance. The leaked lubricating oil continues to drop down over a period of from one week to one month, and is consequently collected at the bottom of the casing 14. The carrier 90 is provided with a relief valve 96 which is adapted to be placed in an open position against a biasing force of a spring, for instance, due to a centrifugal force when the rotating speed of the power transmission system exceeds a predetermined value. When the relief valve 96 is placed in the open position, the lubricating oil in the accommodating space 92 is allowed to be discharged outside of the accommodating space 92 through the valve 96. In the present embodiment, the carrier 90 cooperates with the relief valve 96 to constitute an oil retaining member.

In the thus constructed lubricating device, the differential gear device 18 disposed within the accommodating space 92 is subject to the oil bath lubrication, that is, the differential gear device 18 is immersed in the lubricating oil in the accommodating space 92 while the rotating speed of the power transmission system is relatively low and the relief valve 96 is in the closed position for inhibiting the discharge flow of the lubricating oil from the accommodating space 92. On the other hand, while the rotating speed of the power transmission system is relatively high, that is, when the relief valve 96 is open due to the centrifugal force, the lubricating oil in the accommodating space 92 is discharged outside of the accommodating space 92, making it impossible to oil-bath lubricate the power transmission system. Thus, the power transmission system is forced-feed lubricated exclusively by the lubricating oil delivered by the gear pump 46. This arrangement, therefore, assures a satisfactory lubricating effect over an entire range of the rotating speed of the power transmission system from a relatively low speed to a relatively high speed. At the same time, in the lubricating device according to the present embodiment, since the oil bath lubrication can not be effected while the rotating speed of the power transmission system is relatively high as described above, the present lubricating device is free from the energy loss which would result from the agitation of the lubricating oil.

In the present lubricating device, the lubricating oil is accumulated in the oil reservoir 98 during running of the vehicle, while on the other hand, the lubricating oil is discharged from the oil reservoir 98 by gravity at a controlled flow rate through the orifice 100 when the oil pressure in the branch oil passage 97 is lower than a predetermined level as a result of decrease in the vehicle speed. The discharged lubricating oil is fed through the forced-feed oil passage 94, and is consequently accumulated in the accommodating space 92 in which the differential gear device 18 is accommodated, so that the power transmission system is subject to the oil bath lubrication for a suitable period, providing a sufficient lubricating effect when the vehicle is restarted after stopping for a relatively long period. In the present lubricating device, the lubricating oil is retained in the accommodating space 92 for a suitable period so that the differential gear device 18 is immersed in the lubricating oil in the accommodating space 92. This arrangement assures further effective lubrication especially when the vehicle is restarted after stopping for a relatively long length of time, as compared with the lubricating device according to the second embodiment of FIG. 3 wherein the lubricating oil is adapted to be discharged from the accumulator 60 for a relatively short length of time after the gear pump 46 is turned off. Since the volume of the oil reservoir 98 is sufficient as long as a sufficient amount of the lubricating oil can be supplied to the accommodating space 92, the volume can be made smaller as compared with that of the oil reservoir 52 of the lubricating device according to the first embodiment of FIG. 1, leading to reduction in a total amount of the lubricating oil utilized in the lubricating device. In FIG. 7, a broken line in the accommodating space 92 indicates an oil level which is established when the lubricating oil in the oil reservoir 98 is entirely supplied to the accommodating space 92 after stopping of the vehicle. In the present embodiment, the oil reservoir 98 may be replaced by the accumulator as used in the second or third embodiment.

In the present lubricating device as described above, the carrier 90 has the relief valve 96 which is adapted to be opened due to the centrifugal force when the rotating speed of the carrier 90 exceeds the predetermined value, whereby the lubricating oil is discharged from the accommodating space 92, terminating the oil bath lubrication within the space 92. Thus, the present arrangement is free from the conventionally experienced energy loss which would arise if the oil bath lubrication continued while the rotating speed of the power transmission system is relatively high. Further, in the lubricating device according to the present embodiment, it is possible to keep a sufficient amount of the lubricating oil within the accommodating space 92 for a relatively long period, e.g., from one week to one month, by adjusting an amount of the oil which leaks from the components of the power transmission system. Accordingly, the differential gear device 18 can be adequately lubricated when the vehicle is initially started and when the vehicle is restarted after stopping for a relatively long period, under usual operating condition of the vehicle.

When there is no difference between the rotating speeds of the left and the right wheels of the vehicle, the carrier 90 and the differential gear device 18 are rotated together. In this case, the lubricating oil retained in the accommodating space 92 is not agitated by the rotating members of the power transmission system, leading to reduction in the energy loss due to the agitation of the lubricating oil.

Figure 8:
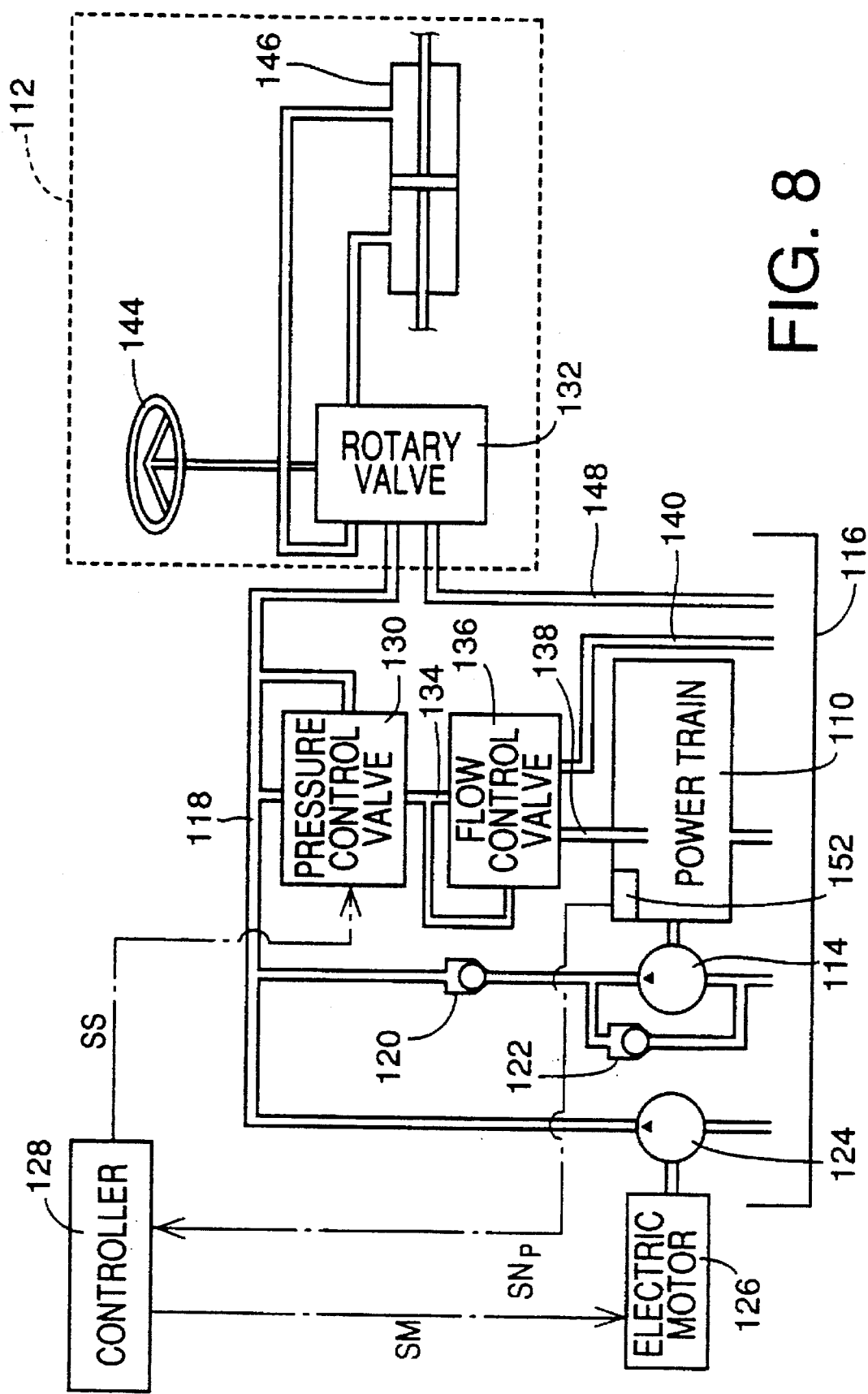
FIG. 8 is a schematic diagram showing a hydraulic circuit used in an electric vehicle, which is constructed according to a yet further embodiment of the invention.

Referring next to FIG. 8, there is illustrated a lubricating device according to a fifth embodiment of the present invention, wherein the lubricating oil is supplied to a power train generally indicated at 110 in FIG. 8 so as to lubricate the power train 110, while at the same time, the oil is supplied to a power steering device indicated at 112 so as to boost a steering force applied to a steering wheel by a vehicle driver. The power train 110 includes a power generating device such as the electric drive motor 10 and a power transmission system such as the transaxle 12 as used in the preceding embodiments. Like the power transmission system in the preceding embodiments, the rotating members of the power train 110 are all at rest during stopping of the vehicle. In this embodiment, a mechanical oil pump 114 such as a gear type pump is connected, directly, or via a gear and a pulley, to a suitable rotating member of the power train 110. The oil pump 114 is adapted to deliver the lubricating oil from an oil pan or an oil sump 116 and supply the oil to a supply passage 118 while the vehicle is running in a forward direction. In the supply passage 118, there is provided a first check valve 120. Further, a second check valve 122 is provided in parallel with the oil pump 114. These check valves 120, 122 are provided so as to prevent the lubricating oil from flowing through the supply passage 118 back toward the pump 114, and further prevent a portion of the supply passage 118 between the first check valve 120 and the oil pump 114 from being evacuated, during a reverse running of the vehicle. It is noted that the lubricating devices in the preceding embodiments may be provided with such check valves for the same purpose as described above. Alternatively, the lubricating devices are constructed such that the oil pump is inhibited from rotating during the reverse running, by providing a one-way clutch, for example.

To the supply passage 118, there is connected an electrically operated pump 124 such that the pump 124 is in parallel connection with the oil pump 114. Accordingly, the lubricating oil delivered by the electric pump 124 as well as the lubricating oil delivered by the mechanical pump 114 flow through the supply passage 118. The electric pump 124 is actuated by an electric motor 126 which is rotated by an on-vehicle electric power source such as a battery. The operation of the electric motor 126 is controlled by a controller 128 which serves as means for controlling the electric pump 124. The supply passage 118 is connected to a pressure control valve 130, and the hydraulic pressure of the lubricating oil flowing through the supply passage 118 is adjusted to a predetermined level by the pressure control valve 130. The lubricating oil whose pressure has been adjusted by the pressure control valve 130 is partially delivered to a rotary valve 132 of the power steering device 112 while on the other hand, the remaining oil is delivered to a flow control valve 136 via an intermediate oil passage 134 and is then supplied to the power train 110 via a supply passage 138 at a controlled flow rate. The valve 136 is connected to a drain passage 140 so that the lubricating oil not supplied to the power train 110 is returned to the oil pan 116 through the drain passage 140. The pressure control valve 130 and the flow control valve 136 are constructed as shown in FIG. 9.

Figure 9:
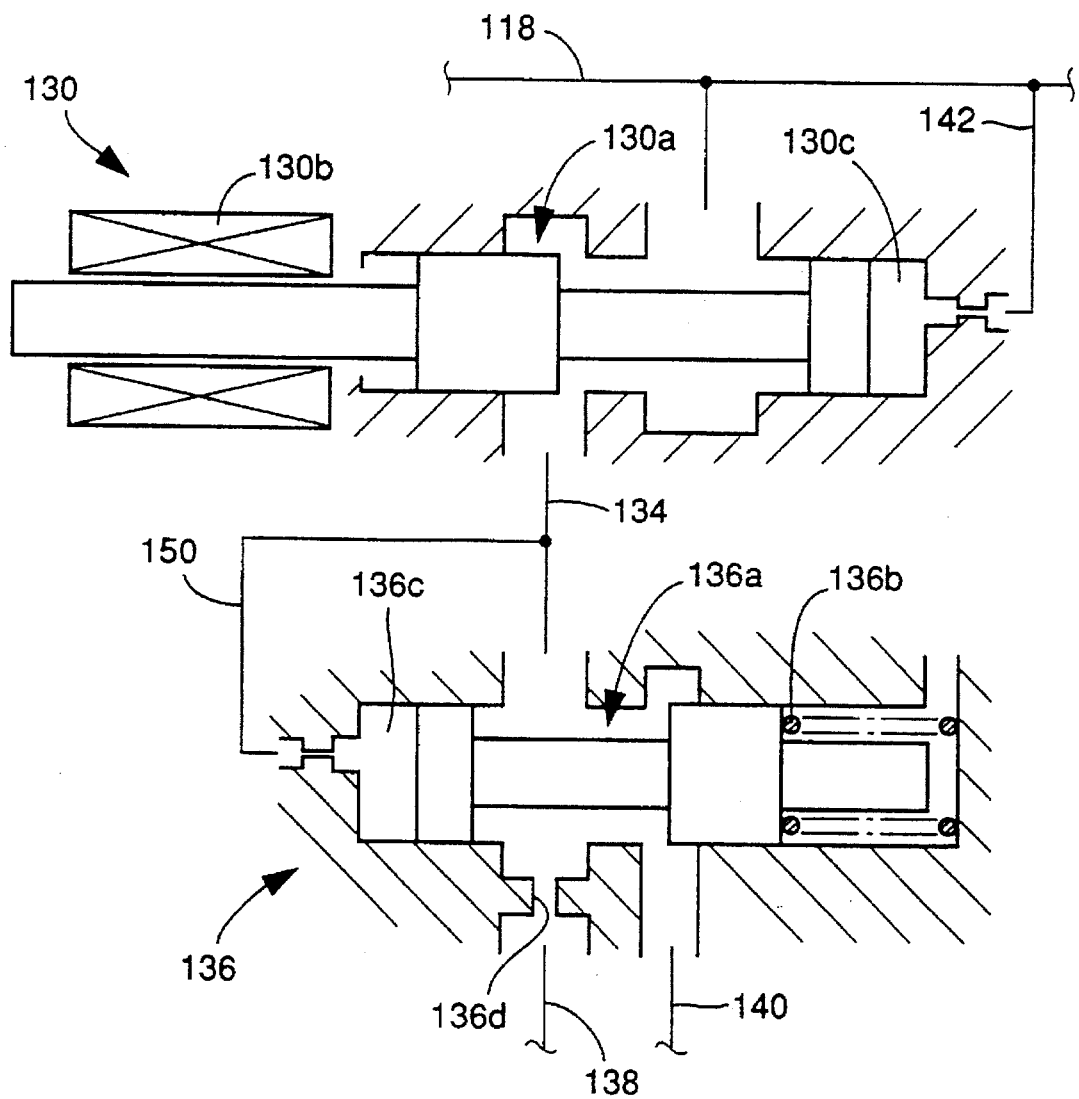
FIG. 9 is a view showing a specific arrangement of a pressure control valve and a flow control valve used in the hydraulic circuit of FIG. 8.

As shown in FIG. 9, the pressure control valve 130 includes a spool 130a, a solenoid coil 130b for biasing the spool 130a in the rightward direction as seen in FIG. 9, and a feedback chamber 130c which receives the lubricating oil supplied from the supply passage 118 via a feedback passage 142. The pressure in the feedback chamber 130c acts on the spool 130a in the leftward direction as seen in FIG. 9. The pressure control valve 130 adjusts the hydraulic pressure of the lubricating oil in the supply passage 118 such that the biasing force of the solenoid coil 130b is balanced with a pressing force generated by the pressure in the feedback chamber 130c. The biasing force of the solenoid coil 130b, in other words, the electromagnetic force of the solenoid coil 130b is controlled by the controller 128. Thus, the hydraulic pressure of the lubricating oil to be supplied to the rotary valve 132 of the power steering device 112 is adjusted. The rotary valve 132 is adapted to boost the steering force which acts on a steering wheel 144 and which is used for steering the vehicle wheels through a cylinder 146 and a rack not shown. The boosting ratio is increased with an increase in the hydraulic pressure applied to the cylinder 146. The lubricating oil supplied to the power steering device 112 for boosting the steering force is returned back to the oil pan 116 through a drain passage 148.

The flow control valve 136 also shown in FIG. 9 includes a spool 136a, a spring 136b for biasing the spool 136a in the leftward direction as seen in FIG. 9, and a feedback chamber 136c which receives the lubricating oil supplied from the intermediate oil passage 134 via a feedback passage 150. The pressure in the feedback chamber 136c acts on the spool 136a in the rightward direction as seen in FIG. 9. The flow control valve 136 adjusts the pressure of the lubricating oil in the intermediate oil passage 134 such that the biasing force of the spring 136b is balanced with a pressing force generated by the pressure in the feedback chamber 136c. In other words, the oil pressure in the intermediate oil passage 134 is adjusted to a predetermined constant level which corresponds to the biasing force of the spring 136b. The lubricating oil whose pressure is adjusted by the flow control valve 136 is supplied to the power train 110 through a supply passage 138 via a flow restrictor 136d at a predetermined constant flow rate controlled by the restrictor 136d. The flow rate is predetermined so that a sufficient lubricating effect is obtained regardless of the rotating speed of the power train 110 and the torque which is transmitted to the power train 110.

The controller 128 is principally constituted by a microcomputer including a CPU (central processing unit), a RAM (random-access memory) and a ROM (read-only memory). The controller 128 receives, from speed detecting means 152 provided with the power train 110, an output signal SNP indicative of a rotating speed NP of a given rotating member in the power train 110. The rotating speed NP corresponds to the vehicle speed V. The controller 128 applies a solenoid control signal SS to the pressure control valve 130 so as to control a current for energizing the solenoid coil 130b such that the oil pressure adjusted by the pressure valve 130 decreases with an increase in the rotating speed NP, in other words, the force boosted by the power steering device 112 decreases with an increase in the vehicle speed V. Further, the controller 128 provides a motor control signal SM for controlling the electric motor 126 to be operated at a predetermined speed NM such that the oil pump 124 is actuated by the electric motor 126 to deliver the lubricating oil when the power train 110 is not adequately lubricated by the lubricating oil delivered from the oil pump 114.

Figure 10:
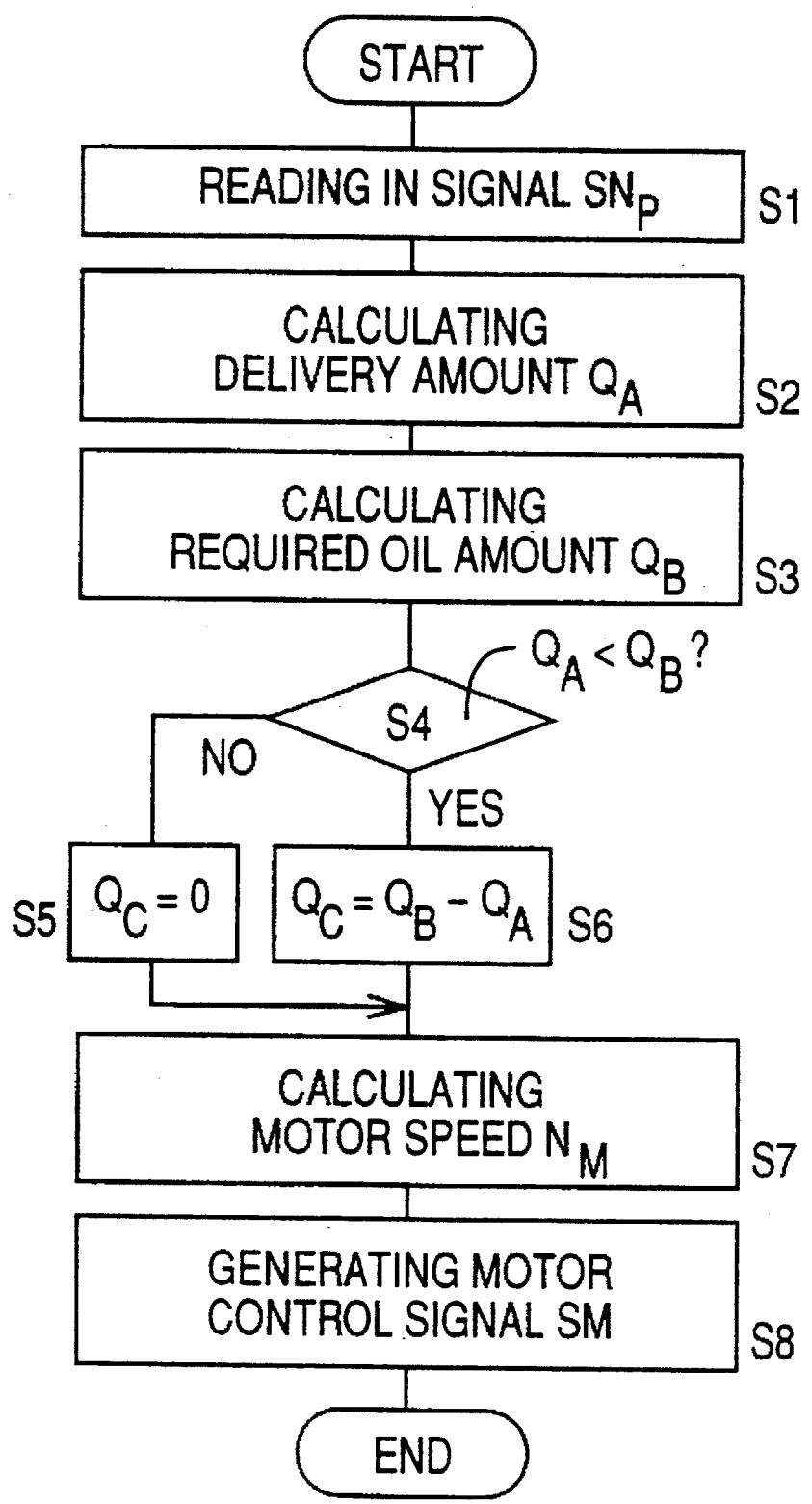
FIG. 10 is a flow chart illustrating a control program for controlling an electric motor for driving a pump used in the lubricating device of FIG. 8.

Referring to a flow chart of FIG. 10, there is illustrated a routine executed by the controller 128 for generating the motor control signal SM for operating the electric motor 126. The routine is initiated with step S1 in which the controller 128 reads in the rotating speed signal SNP generated by the the detecting means 152 of the power train 110. Step S1 is followed by step S2 to calculate a delivery amount QA of the oil pump 114 based on the rotating speed NP represented by the signal SNP, according to a predetermined equation or data map. Namely, the delivery amount QA can be obtained from the rotating speed NP of the power train 110 since the rotating speed NP coincides with the operating speed of the oil pump 114. The control flow then goes to step S3 to calculate an oil amount QB which is required to lubricate the power train 110, on the basis of the rotating speed NP. The required amount QB permits the pressure control valve 130 to adjust the pressure of the lubricating oil in the supply passage 118 to the predetermined level according to the solenoid control signal SS supplied from the controller 128. The required oil amount QB is a sufficient amount to be supplied to the power train 110 at the controlled flow rate via the pressure control valve 130 and the flow control valve 136. Like the delivery amount QA, the required amount QB can be obtained based on the rotating speed NP according to a suitable equation or data map since the pressure control valve 130 adjusts the pressure of the lubricating oil in the supply passage 118 depending on the rotating speed Np of the power train 110.

The control flow then goes to step S4 to determine whether or not the delivery amount QA is smaller than the required amount QB. If the discharge amount QA is not smaller than the required amount QB, this means that the power train 110 is adequately lubricated by the lubricating oil delivered from the oil pump 114 and the control flow goes to step S5 to set a shortage oil amount QC at zero. If it is judged in step S4 that the delivery amount QA is smaller than the required amount QB, step S4 is followed by step S6 to calculate the shortage amount QC by subtracting the actual delivery amount QA from the required amount QB (QC=QB−QA). The delivery amount QA increases proportionally with an increase in the rotating speed NP, i.e., the vehicle speed V. On the other hand, the required amount QB decreases as a whole with an increase in the vehicle speed V, because the present embodiment is adapted such that the amount supplied to the power train 110 is substantially constant irrespective of a change in the vehicle speed V, and such that the amount supplied to the power steering device 112 decreases with an increase in the vehicle speed V. Accordingly, while the vehicle is running at a relatively low speed or the vehicle is at a stop, the delivery amount QA is smaller than the required amount QB, and an affirmative decision (YES) is obtained in step S4. While the vehicle is running at a medium or a high speed, the delivery amount QA is larger than the required amount QB, and a negative decision (NO) is obtained in step S4. The control flow then goes to step S7 to calculate a motor rotating speed NM at which the electric motor 126 is rotated so as to permit the electric pump 124 to deliver the lubricating oil by an amount equal to the shortage amount QC calculated in step S6. The calculation in step S7 to obtain the motor rotating speed NM is effected according to a suitable equation or a data map. Step S7 is followed by step S8 wherein the controller 128 generates a motor control signal SM for operating the electric motor 126 at the obtained motor rotating speed NM. It will be understood that a portion of the controller 128 assigned to execute the routine of FIG. 10 serves as pump control means for controlling the motor 126 to control the oil pump 124.

The lubricating device constructed according to the present embodiment is provided with the electric pump 124 which is actuated by the motor 126 and disposed in parallel with the mechanical oil pump 114. The electric pump 124 is controlled by the controller 128 such that the electric pump 124 delivers the lubricating oil by an amount equal to the shortage amount QC when the delivery amount of the mechanical pump 114 is insufficient for lubricating the power train 110. In this arrangement, a sufficient amount of the lubricating oil can be supplied to the power train 110 by the electric pump 124 during low-speed running of the vehicle or starting of the vehicle, that is, while the delivery amount of the mechanical oil pump 114 is relatively small. Accordingly, the power train 110 is protected from seizure, wearing and damages which would be caused by the shortage of the lubricating oil, assuring a considerably improved life expectancy of the bearings and gears, and the power steering device 112 functions in the intended fashion. In the present embodiment, the power train 110 is not always required to be immersed in the lubricating oil since the power train 110 can be adequately lubricated by the oil supplied from the electric pump 124 even upon starting of the vehicle or low-speed running of the vehicle. This provides an advantage of further reducing the energy loss due to the agitation of the oil by the power train during high-speed running of the vehicle.

While the vehicle is running at a medium or a high speed, the power train 110 can be adequately lubricated by the lubricating oil supplied from the mechanical pump 114, without an operation of the electric pump 124. Thus, the electric power consumption is reduced in the present lubricating device as compared with the conventional lubricating device wherein the lubricating oil is supplied exclusively by the electric pump. Further, the service life of a brush and other components of the electric motor 126 is significantly improved, assuring easy maintenance of the vehicle and improved operating reliability of the lubricating device. In particular, the motor speed NM at which the electric motor 126 is rotated to actuate the electric pump 124 is accurately controlled in the present embodiment such that the electric pump 124 is capable of supplying the lubricating oil to the power train 110 by an amount equal to the shortage amount QC calculated by the controller 128, leading to further reduction in the electric power consumption and further improvement in the service life of the components of the electric pump 124. In the graph of FIG. 11, a solid line shows a relationship between the motor rotating speed NM and the vehicle speed V in the present embodiment while a one-dot chain line shows the relationship in a lubricating device without the mechanical pump 114 wherein the lubricating oil is supplied exclusively by the electric pump 124. As shown in the graph, the operating time of the electric motor 126 is considerably shorter in the present embodiment.

The present lubricating device is adapted to use a part of the lubricating oil as a working fluid for actuating the power steering device 112. This eliminates an exclusive electric pump for the power steering device 112, thereby to reduce overall cost and weight of the device 112. In the present lubricating device, the lubricating oil whose pressure has been adjusted by the pressure control valve 130 and which is not supplied to the power steering device 112 is delivered to the power train 110. Thus, the lubricating oil delivered from the mechanical oil pump 114 and the electric pump 124 is efficiently utilized for lubricating the power train 110. The required oil amount QB for lubricating the power train 110 is reduced, making it possible to reduce a total amount of the electric power to be consumed.

Referring to FIG. 12, there is illustrated a valve 156 which is employed in place of the pressure control valve 130 and the flow control valve 136 in the lubricating device of FIG. 8. This valve 156 includes a spool 156a, a solenoid coil 156b for biasing the spool 156a in the rightward direction as seen in FIG. 12, and a feedback chamber 156c which receives the lubricating oil from the supply passage 118 via the feedback passage 142. The pressure in the feedback chamber 156c acts on the spool 156a in the leftward direction as seen in FIG. 12. The valve 156 adjusts the oil pressure in the supply passage 118 such that the biasing force of the solenoid coil 156b is balanced with a pressing force generated by the pressure in the feedback chamber 156c. The lubricating oil whose pressure has been adjusted by the valve 156 is supplied to the rotary valve 132 of the power steering device 112. The lubricating oil which is not supplied to the rotary valve 132 is supplied to the power train 110 by a suitable amount via the supply passage 138, and the remaining oil is fed back to the oil pan 116 via the drain passage 140.

Next, there will be described a sixth embodiment of the present invention referring to FIG. 13. Unlike the preceding fifth embodiment, the second drain passage 148 is connected to the intermediate oil passage 134, and the supply passage 118 is connected to an accumulator 160. In this arrangement, the lubricating oil discharged from the rotary valve 132 is fed into the intermediate passage 134 through the second drain passage 148. Accordingly, the lubricating oil delivered by the oil pump 114 driven by the electric motor 126 is entirely delivered to the flow control valve 136, whereby the lubricating oil is further efficiently utilized for lubricating the power train 110 and the required amount QB of the lubricating oil for lubricating the power train 110 is reduced, leading to reduction in the electric power consumption of the vehicle. The present lubricating device is constructed such that the lubricating oil is discharged from the accumulator 160 when the delivery amount of the oil pump 114 is relatively small. This arrangement is effective to reduce the delivery amount of the electric pump 124 so that the electric power consumed by the electric motor 126 is further reduced. The volume or pressure of the oil in the accumulator 160 can be detected based on the position of the piston in the accumulator 160 or the hydraulic pressure in the accumulator 160, for instance. Based on the detected volume or pressure in the accumulator 160, the controller 128 determines whether the amount of the lubricating oil is sufficient or not and controls the operation of the electric pump 124. The present embodiment may be modified such that the accumulator 160 is replaced by the oil reservoir 52, 98 employed in the preceding embodiments of FIGS. 1 and 7. Between the accumulator 160 and the supply passage 118, valve means for permitting or inhibiting the discharge flow of the oil from the accumulator 160 may be provided as in the embodiment of FIG. 5.

While the present invention has been described in detail with its presently preferred embodiments for the illustrative purpose only, it is to be understood that the invention is not limited to the details of the illustrated embodiments, but may be otherwise embodied.

In the above-described embodiments of FIGS. 1–7 according to the principle of the invention, the lubricating devices are used for the transaxle 12 which includes the speed reducing device 16 and the differential gear device 18. The construction of the speed reducing device 16 and the differential gear device 18 may be suitably modified. Further, the principle of the invention is equally applicable to various types of power transmission system, such as a transmission employing clutches and brakes which are selectively operated to provide a plurality of speed ratios.

In the lubricating device according to the fifth embodiment of FIG. 8, the lubricating oil is supplied to the power train 110 at the substantially constant flow rate, regardless of the changes in the vehicle speed V and the torque which is transmitted to the power train 110 from the electric drive motor 10. The flow rate of the lubricating oil supplied to the power train 110 may be controlled by providing a suitable flow control valve such as a solenoid-operated valve capable of automatically adjusting the flow rate, depending upon the load applied to the power train 110, i.e., the rotating speed NP of a rotating member of the power train 110, the torque transmitted to the power train 110, or the rate of change in the transmitted torque. In this case, the controller 128 calculates the required oil amount QB, taking into account the flow rate adjusted by the flow control valve.

In the fifth embodiment of FIG. 8, the pressure of the lubricating oil supplied to the power steering device 112 is adjusted by the pressure control valve 130, based solely on the vehicle speed V, i.e., the rotating speed NP of the power train 110. However, the hydraulic pressure applied to the power steering device 112 may be accurately adjusted by using other parameters such as steering angle, angular velocity, or angular acceleration of the steering wheel 144.

Figure 13:
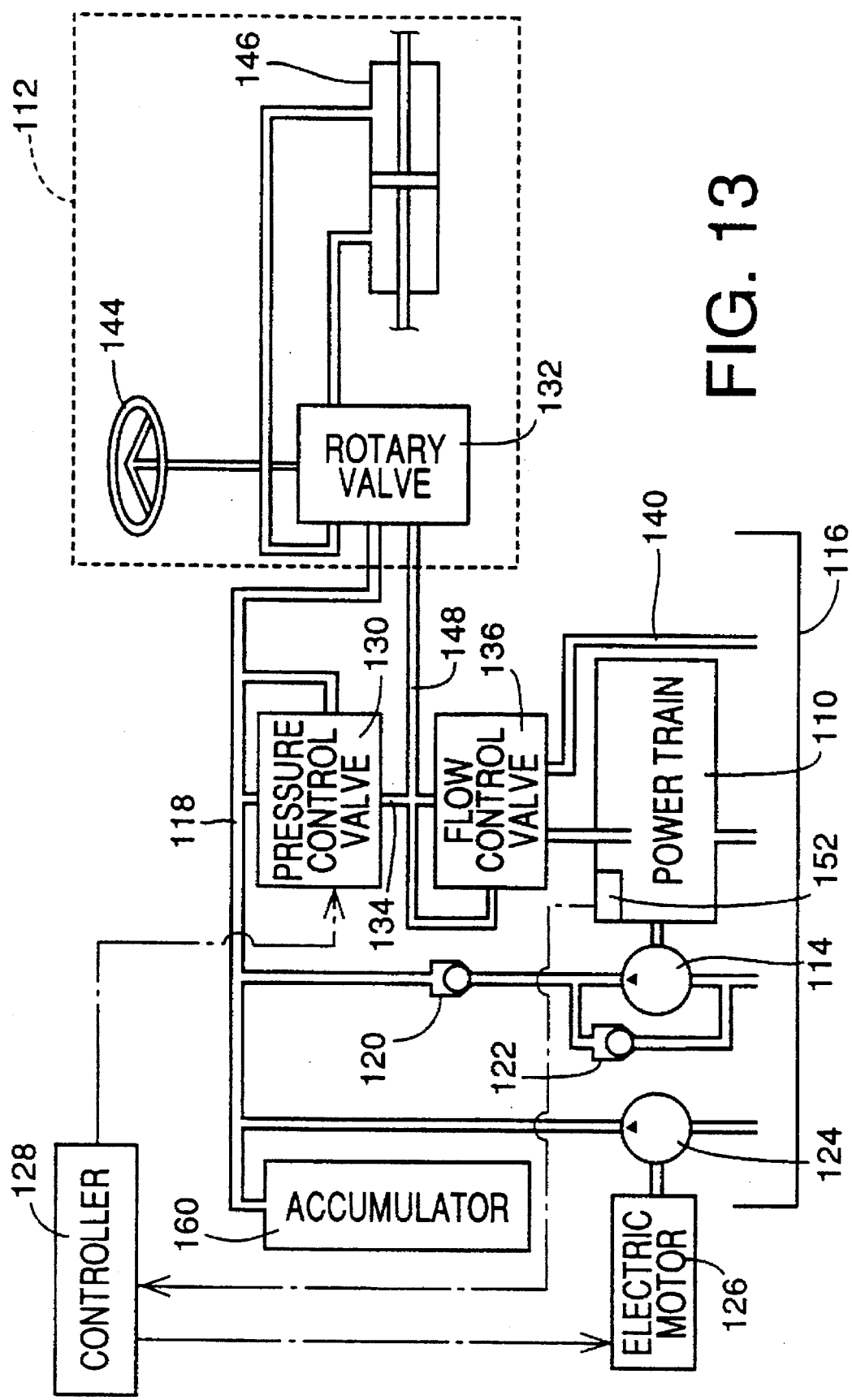
FIG. 13 is a schematic diagram showing a lubricating device used in an electric vehicle, which is constructed according to another embodiment of the invention.

The power steering device 112 in the fifth and sixth embodiments of FIGS. 9 and 13 may be modified to be a speed sensing type wherein the hydraulic pressure in the supply passage 118 is lowered with an increase in the vehicle speed V, if the hydraulic pressure of the lubricating oil delivered from the oil pump 114 is applied to the spool 130a of the pressure control valve 130 in the leftward direction as viewed in FIG. 9. Similar modification of the flow control valve 136 is possible. That is, if the pressure of the oil delivered from the oil pump 114 is applied to the spool 136a in the leftward direction as viewed in FIG. 9, the amount of the lubricating oil supplied to the power train 110 via the supply passage 138 can be increased with an increase in the vehicle speed V.

The construction of the hydraulic circuits in the fifth and sixth embodiments of FIGS. 9 and 13 may also be modified. For instance, the flow control valve 136 may be eliminated so that the lubricating oil from the pressure control valve 130 is delivered directly to the power train 110 via the intermediate oil passage 134. Alternatively, both of the pressure and flow control valves 130, 136 may be eliminated. In this case, the lubricating oil in the supply passage 118 is directly delivered to the rotary valve 132 of the power steering device 112 while the lubricating oil discharged from the rotary valve 132 is delivered to the power train 110 via the drain passage 148 so as to lubricate the power train 110.

It is also to be understood that the present invention may be embodied with various other changes, modifications and improvements which may occur to those skilled in the art, without departing from the spirit and scope of the invention defined in the following claims.

What is claimed is:

1. A lubricating device for a motor vehicle including a power transmission system having rotating members which are all at rest upon stopping of the vehicle, a casing which accommodates said power transmission system and which stores a lubricating oil in a bottom portion thereof, and a mechanical oil pump which is driven by said power transmission system and which operates to deliver said lubricating oil from said bottom portion of said casing to lubricating points of said power transmission system, said lubricating device comprising:

an oil reservoir which stores a predetermined amount of said lubricating oil delivered by said mechanical oil pump, when a delivery amount of said mechanical oil pump exceeds a predetermined value with an increase in a rotating speed of said power transmission system, said oil reservoir being positioned above said power transmission system, and having discharging means for discharging said lubricating oil therefrom by gravity for lubrication of said power transmission system even after said mechanical oil pump is turned off with said motor vehicle being stopped; and a bath of said lubricating oil stored in said bottom portion of said casing having a first oil level when an amount of said lubricating oil stored in said oil reservoir is substantially zero, and a second oil level when said predetermined amount of the lubricating oil delivered by said mechanical oil pump is stored in said oil reservoir, said first oil level being determined such that a portion of said power transmission system is immersed in said bath of said lubricating oil, said second oil level being determined such that a lower end of said power transmission system is located above said second oil level.

2. A lubricating device for a motor vehicle according to claim 1, wherein said oil reservoir has flow regulating means for regulating a rate of flow of said oil discharged from said oil reservoir through said discharging means so that said oil reservoir begins to store said lubricating oil when said delivery amount of said mechanical oil pump exceeds said predetermined value.

3. A lubricating device for a motor vehicle according to claim 1, wherein said discharging means has a drain port formed through a bottom wall of said oil reservoir, said drain port being dimensioned so that said oil reservoir begins to store said oil when said delivery amount of said mechanical oil pump exceeds said predetermined value.

4. A lubricating device for a motor vehicle including a power transmission system having rotating members which are all at rest upon stopping of the vehicle, and a mechanical oil sump which is driven by said power transmission system and which operates to deliver a lubricating oil from an oil sump to lubricating points of said power transmission system, said lubricating device comprising:

an oil reservoir having an oil chamber which stores a predetermined amount of said lubricating oil delivered by said mechanical pump;

a discharge line through which said lubricating oil stored in said oil chamber of said oil reservoir is discharged to said lubricating points of said power transmission system; and flow restricting means for restricting a rate of flow of said lubricating oil discharged from said oil chamber of said oil reservoir through said discharge lines;

wherein said oil reservoir includes moveable means for partially defining said oil chamber and biasing means for biasing said moveable means toward said oil chamber so that said lubricating oil is discharged from said oil chamber to said lubricating points through the flow restricting means even after said mechanical oil pump is turned off with said motor vehicle being stopped.

5. A lubricating device for a motor vehicle according to claim 4, further comprising a forced-feed oil passage connecting said oil pump and said lubricating points, and wherein said discharge line comprises of a part of said forced-feed oil passage.

6. A lubricating device for a motor vehicle according to claim 4, wherein said flow restricting means comprises an orifice having a constant cross sectional area.

7. A lubricating device for a motor vehicle according to claim 4, wherein said oil reservoir is an accumulator having a piston as said moveable means which partially defines said oil chamber and which is biased by said biasing means toward said oil chamber.

8. A lubricating device for a motor vehicle according to claim 4, wherein said oil reservoir is an accumulator having a diaphragm, as said moveable means which partially defines said oil chamber and a gas chamber filled with a gas, said diaphragm biased by a pressure of said gas toward said oil chamber, said pressure of said gas functioning as said biasing means.

* * * * *